United States Patent
Wang et al.

(10) Patent No.: US 11,410,449 B2
(45) Date of Patent: Aug. 9, 2022

(54) HUMAN PARSING TECHNIQUES UTILIZING NEURAL NETWORK ARCHITECTURES

(71) Applicant: Inception Institute of Artificial Intelligence, Ltd., Abu Dhabi (AE)

(72) Inventors: Wenguan Wang, Abu Dhabi (AE); Jianbing Shen, Abu Dhabi (AE); Zhijie Zhang, Abu Dhabi (AE); Ling Shao, Abu Dhabi (AE)

(73) Assignee: Inception Institute of Artificial Intelligence, Ltd., Abu Dhabi (AE)

( * ) Notice: Subject to any disclaimer, the term of this patent is extended or adjusted under 35 U.S.C. 154(b) by 524 days.

(21) Appl. No.: 16/656,241

(22) Filed: Oct. 17, 2019

(65) Prior Publication Data

US 2021/0117662 A1    Apr. 22, 2021

(51) Int. Cl.
 *G06V 40/10* (2022.01)
 *G06N 3/04* (2006.01)
 (Continued)

(52) U.S. Cl.
 CPC ......... *G06V 40/10* (2022.01); *G06K 9/6288* (2013.01); *G06N 3/04* (2013.01); *G06N 5/04* (2013.01); *G06Q 50/01* (2013.01); *G06V 40/166* (2022.01)

(58) Field of Classification Search
 CPC .... G06V 40/10; G06V 40/166; G06V 10/454; G06V 10/82; G06V 20/52; G06V 10/22; G06V 10/40; G06V 20/40; G06V 10/273; G06V 10/42; G06V 20/46; G06V 10/25; G06V 10/267; G06V 10/24; G06V 10/10; G06K 9/6288; G06K 9/6271; G06K 9/6292; G06K 9/6267; G06K 9/6256; G06K 9/6227; G06K 9/629; G06K 9/00503;
 (Continued)

(56) References Cited

U.S. PATENT DOCUMENTS

| 8,775,341 B1 * | 7/2014 | Commons | G06F 40/253 706/20 |
| 2005/0094879 A1 * | 5/2005 | Harville | G06V 20/64 382/209 |

(Continued)

OTHER PUBLICATIONS

V. Badrinarayanan, A. Kendall, and R. Cipolla. Segnet: A deep convolutional encoder-decoder architecture for image segmentation. IEEE TPAMI, 39(12):2481-2495, 2017.

(Continued)

*Primary Examiner* — Nimesh Patel
(74) *Attorney, Agent, or Firm* — Bryan Cave Leighton Paisner LLP

(57) ABSTRACT

This disclosure relates to improved techniques for performing human parsing functions using neural network architectures. The neural network architecture can model human objects in images using a hierarchal graph of interconnected nodes that correspond to anatomical features at various levels. Multi-level inference information can be generated for each of the nodes using separate inference processes. The multi-level inference information for each node can be combined or fused to generate final predictions for each of the nodes. Parsing results may be generated based on the final predictions.

20 Claims, 6 Drawing Sheets
(2 of 6 Drawing Sheet(s) Filed in Color)

(51) Int. Cl.
- *G06Q 50/00* (2012.01)
- *G06K 9/62* (2022.01)
- *G06N 5/04* (2006.01)
- *G06V 40/16* (2022.01)

(58) Field of Classification Search
CPC ...... G06K 9/6262; G06K 9/6228; G06N 3/04; G06N 5/04; G06N 20/20; G06N 3/0481; G06N 5/003; G06N 3/0454; G06N 5/022; G06N 5/042; G06N 3/08; G06N 3/02; G06N 20/00; G06N 3/0472; G06N 3/10; G06N 5/02; G06N 3/0436; G06N 3/006; G06N 3/126; G06N 5/046; G06N 7/005; G06Q 50/01

See application file for complete search history.

(56) References Cited

U.S. PATENT DOCUMENTS

| | | | | |
|---|---|---|---|---|
| 2014/0369596 | A1* | 12/2014 | Siskind | G06V 20/47 382/158 |
| 2020/0066405 | A1* | 2/2020 | Peyman | G16H 20/40 |
| 2021/0035187 | A1* | 2/2021 | Ning | G06T 11/60 |
| 2021/0065364 | A1* | 3/2021 | Biswas | G06F 17/18 |

OTHER PUBLICATIONS

P. W. Battaglia, J. B. Hamrick, V. Bapst, A. Sanchez-Gonzalez, V. Zambaldi, M. Malinowski, A. Tacchetti, D. Ra-poso, A. Santoro, R. Faulkner, et al. Relational inductive biases, deep learning, and graph networks. arXiv preprint arXiv:1806.01261, 2018.
H. Chen, Z. J. Xu, Z. Q. Liu, and S. C. Zhu. Composite templates for cloth modeling and sketching. In CVPR, pp. 943-950, 2006.
L.-C. Chen, G. Papandreou, I. Kokkinos, K. Murphy, and A. L. Yuille. Deeplab: Semantic image segmentation with deep convolutional nets, atrous convolution, and fully connected crfs. IEEE TPAMI, 40(4):834-848, 2018.
L.-C. Chen, G. Papandreou, F. Schroff, and H. Adam. Rethinking atrous convolution for semantic image segmentation. CoRR, abs/1706.05587, 2017.
L.-C. Chen, Y. Yang, J. Wang, W. Xu, and A. L. Yuille. Attention to scale: Scale-aware semantic image segmentation. In CVPR, pp. 3640-3649, 2016.
L.-C. Chen, Y. Zhu, G. Papandreou, F. Schroff, and H. Adam. Encoder-decoder with atrous separable convolution for segmantic image segmentation. In ECCV, 2018.
X. Chen, R. Mottaghi, X. Liu, S. Fidler, R. Urtasun, and A. Yuille. Detect what you can: Detecting and representing objects using holistic models and body parts. In CVPR, pp. 1971-1978, 2014.
T. G. Dietterich. Ensemble methods in machine learning. In International workshop on multiple classifier systems, pp. 1-15, 2000.
J. Dong, Q. Chen, X. Shen, J. Yang, and S. Yan. Towards unified human parsing and pose estimation. In CVPR, pp. 843-850, 2014.
J. Dong, Q. Chen, W. Xia, Z. Huang, and S. Yan. A de-formable mixture parsing model with parselets. In ICCV, pp. 3408-3415, 2013.
B. Epshtein, I. Lifshitz, and S. Ullman. Image interpretation by a single bottom-up top-down cycle. Proceedings of the National Academy of Sciences, 105(38): 14298-14303, 2008.
H.-S. Fang, G. Lu, X. Fang, J. Xie, Y.-W. Tai, and C. Lu. Weakly and semi supervised human body part parsing via pose-guided knowledge transfer. In CVPR, pp. 70-78, 2018.
P. F. Felzenszwalb, R. B. Girshick, D. McAllester, and D. Ramanan. Object detection with discriminatively trained partbased models. IEEE TPAMI, 32(9): 1627-1645, 2010.
P. F. Felzenszwalb and D. P. Huttenlocher. Pictorial structures for object recognition. IJCV, 61(1):55-79, 2005.
Y. Freund and R. E. Schapire. A decision-theoretic generalization of on-line learning and an application to boosting. Journal of Computer and System Sciences, pp. 119-139, 1997.
J. Gilmer, S. S. Schoenholz, P. F. Riley, O. Vinyals, and G. E. Dahl. Neural message passing for quantum chemistry. In ICML, pp. 1263-1272, 2017.
K. Gong, X. Liang, Y. Li, Y. Chen, M. Yang, and L. Lin. Instance-level human parsing via part grouping network. In ECCV, pp. 770-785, 2018.
K. Gong, X. Liang, D. Zhang, X. Shen, and L. Lin. Look into person: Self-supervised structure-sensitive learning and a new benchmark for human parsing. In CVPR, pp. 932-940, 2017.
K. Grill-Spector and K. S. Weiner. The functional architecture of the ventral temporal cortex and its role in categorization. Nature Reviews Neuroscience, 15(8):536, 2014.
K. He, X. Zhang, S. Ren, and J. Sun. Deep residual learning for image recognition. In CVPR, pp. 770-778, 2016.
G. E. Hinton. Training products of experts by minimizing contrastive divergence. Neural computation, pp. 1771-1800, 2002.
K. Hornik, M. Stinchcombe, and H. White. Multilayer feed-forward networks are universal approximators. Neural networks, pp. 359-366, 1989.
J. Hu, L. Shen, and G. Sun. Squeeze-and-excitation networks. In CVPR, pp. 7132-7141, 2018.
A. Jain, A. R. Zamir, S. Savarese, and A. Saxena. Structural-RNN: Deep learning on spatio-temporal graphs. In CVPR, pp. 5308-5317, 2016.
T. Joachims, T. Finley, and C.-N. J. Yu. Cutting-plane training of structural svms. Machine Learning, 77(1):27-59, 2009.
B. Khaleghi, A. Khamis, F. O. Karray, and S. N. Razavi. Multisensor data fusion: A review of the state-of-the-art. Information fusion, 14(1):28-44, 2013.
R. Kimchi. Primacy of wholistic processing and global/local paradigm: a critical review. Psychological bulletin, p. 24, 1992.
L. Ladicky, P. H. Torr, and A. Zisserman. Human pose estimation using a joint pixel-wise and part-wise formulation. In CVPR, pp. 3578-3585, 2013.
Q. Li, A. Arnab, and P. H. Torr. Holistic, instance-level human parsing. arXiv preprint arXiv:1709.03612, 2017.
S. Liang and R. Srikant. Why deep neural networks for function approximation? In ICLR, 2017.
X. Liang, L. Lin, X. Shen, J. Feng, S. Yan, and E. P. Xing. Interpretable structure-evolving lstm. In CVPR, pp. 1010-1019, 2017.
X. Liang, S. Liu, X. Shen, J. Yang, L. Liu, J. Dong, L. Lin, and S. Yan. Deep human parsing with active template regression. IEEE TPAMI, 37(12):2402-2414, 2015.
X. Liang, X. Shen, J. Feng, L. Lin, and S. Yan. Semantic object parsing with graph lstm. In ECCV, pp. 125-143, 2016.
X. Liang, X. Shen, D. Xiang, J. Feng, L. Lin, and S. Yan. Semantic object parsing with local-global long short-term memory. In CVPR, pp. 3185-3193, 2016.
X. Liang, C. Xu, X. Shen, J. Yang, S. Liu, J. Tang, L. Lin, and S. Yan. Human parsing with contextualized convolutional neural network. In ICCV, pp. 1386-1394, 2015.
S. Liu, J. Feng, C. Domokos, H. Xu, J. Huang, Z. Hu, and S. Yan. Fashion parsing with weak color-category labels. TMM, 16(1):253-265, 2014.
S. Liu, X. Liang, L. Liu, X. Shen, J. Yang, C. Xu, L. Lin, X. Cao, and S. Yan. Matching-cnn meets knn: Quasi-parametric human parsing. In CVPR, pp. 1419-1427, 2015.
S. Liu, Y. Sun, D. Zhu, G. Ren, Y. Chen, J. Feng, and J. Han. Cross-domain human parsing via adversarial feature and label adaptation. In AAAI, 2018.
T. Liu, T. Ruan, Z. Huang, Y. Wei, S. Wei, Y. Zhao, and T. Huang. Devil in the details: Towards accurate single and multiple human parsing. arXiv preprint arXiv:1809.05996, 2018.
J. Long, E. Shelhamer, and T. Darrell. Fully convolutional networks for semantic segmentation. In CVPR, pp. 3431-3440, 2015.
P. Luc, C. Couprie, S. Chintala, and J. Verbeek. Semantic segmentation using adversarial networks. In NIPS-workshop, 2016.
P. Luo, X. Wang, and X. Tang. Pedestrian parsing via deep decompositional network. In ICCV, pp. 2648-2655, 2013.

(56) References Cited

OTHER PUBLICATIONS

X. Luo, Z. Su, J. Guo, G. Zhang, and X. He. Trusted guidance pyramid network for human parsing. In ACMMM, 2018.
Y. Luo, Z. Zheng, L. Zheng, T. Guan, J. Yu, and Y. Yang. Macro-micro adversarial network for human parsing. In ECCV, pp. 418-434, 2018.
A. J. Marcel. Conscious and unconscious perception: An approach to the relations between phenomenal experience and perceptual processes. Cognitive psychology, 15(2):238-300, 1983.
T. M. Mitchell. The need for biases in learning generalizations. Department of Computer Science, Laboratory for Computer Science Research, 1980.
D. Navon. Forest before trees: The precedence of global features in visual perception. Cognitive psychology, pp. 353-383, 1977.
X. Nie, J. Feng, and S. Yan. Mutual learning to adapt for joint human parsing and pose estimation. In ECCV, pp. 502-517, 2018.
S. Qi, W. Wang, B. Jia, J. Shen, and S.-C. Zhu. Learning human-object interactions by graph parsing neural networks. In ECCV, pp. 401-417, 2018.
O. Russakovsky, J. Deng, H. Su, J. Krause, S. Satheesh, S. Ma, Z. Huang, A. Karpathy, A. Khosla, M. S. Bernstein, A. C. Berg, and F. Li. Imagenet large scale visual recognition challenge. IJCV, 115(3):211-252, 2015.
E. Simo-Serra, S. Fidler, F. Moreno-Noguer, and R. Urtasun. A high performance crf model for clothes parsing. In ACCV, p. 64 81, 2014.
X. Song, T. Wu, Y. Jia, and S.-C. Zhu. Discriminatively trained and-or tree models for object detection. In CVPR, 2013.
C. Sutton, A. McCallum, et al. An introduction to conditional random fields. Foundations and Trends® in Machine Learning, pp. 267-373, 2012.
W. Tang, P. Yu, and Y. Wu. Deeply learned compositional models for human pose estimation. In ECCV, pp. 190-206, 2018.
M. J. Tarr and H. H. Bülthoff. Image-based object recognition in man, monkey and machine. Cognition, pp. 1-20, 1998.
A. Veit and S. Belongie. Convolutional networks with adaptive inference graphs. In ECCV, pp. 3-18, 2018.
M. J. Wainwright, M. I. Jordan, et al. Graphical models, exponential families, and variational inference. Foundations and Trends® in Machine Learning, pp. 1-305, 2008.
N. Wang and H. Ai. Who blocks who: Simultaneous clothing segmentation for grouping images. In ICCV, pp. 1535-1542, 2011.
P. Wang, X. Shen, Z. Lin, S. Cohen, B. Price, and A. L. Yuille. Joint object and part segmentation using deep learned potentials. In ICCV, pp. 1573-1581, 2015.
T. Wu and S.-C. Zhu. A numerical study of the bottom-up and top-down inference processes in and-or graphs. IJCV, 93(2):226-252, 2011.
F. Xia, P. Wang, X. Chen, and A. L. Yuille. Joint multi-person pose estimation and semantic part segmentation. In CVPR, pp. 6769-6778, 2017.
F. Xia, J. Zhu, P. Wang, and A. L. Yuille. Pose-guided human parsing by an and/or graph using pose-context features. In AAAI, 2016.
K. Yamaguchi, M. Hadi Kiapour, and T. L. Berg. Paperdoll parsing: Retrieving similar styles to parse clothing items. In ICCV, pp. 3519-3526, 2013.
K. Yamaguchi, M. H. Kiapour, L. E. Ortiz, and T. L. Berg. Parsing clothing in fashion photographs. In CVPR, pp. 3570-3577, 2012.
W. Yang, P. Luo, and L. Lin. Clothing co-parsing by joint image segmentation and labeling. In CVPR, pp. 3182-3189, 2014.
H. Zhao, J. Shi, X. Qi, X. Wang, and J. Jia. Pyramid scene parsing network. In CVPR, pp. 6230-6239, 2017.
J. Zhao, J. Li, Y. Cheng, T. Sim, S. Yan, and J. Feng. Understanding humans in crowded scenes: Deep nested adversarial learning and a new benchmark for multi-human parsing. In ACMMM, pp. 792-800, 2018.
J. Zhao, J. Li, X. Nie, F. Zhao, Y. Chen, Z. Wang, J. Feng, and S. Yan. Self-supervised neural aggregation networks for human parsing. In CVPR-workshop, pp. 7-15, 2017.
S. Zheng, S. Jayasumana, B. Romera-Paredes, V. Vineet, Z. Su, D. Du, C. Huang, and P. H. Torr. Conditional random fields as recurrent neural networks. In ICCV, 2015.
Q. Zhou, X. Liang, K. Gong, and L. Lin. Adaptive temporal encoding network for video instance-level human parsing. In ACMMM, pp. 1527-1535, 2018.
B. Zhu, Y. Chen, M. Tang, and J. Wang. Progressive cognitive human parsing. In AAAI, 2018.
S. Zhu, R. Urtasun, S. Fidler, D. Lin, and C. Change Loy. Be your own prada: Fashion synthesis with structural coherence. In ICCV, pp. 1680-1688, 2017.
L.-C. Chen, Y. Zhu, G. Papandreou, F. Schroff, and H. Adam. Encoder-decoder with atrous separable convolution for semantic image segmentation. In ECCV, pp. 833-851, 2018.
X. Liang, S. Liu, X. Shen, J. Yang, L. Liu, J. Dong, L. Lin, and S. Yan. Deep human parsing with active template Yegression. IEEE TPAMI, 37(12):2402-2414, 2015.

* cited by examiner (a) input image  (b) hierarchical human parsing  (c) hierarchical human graph  (d) conditional neural information fusion

US 11,410,449 B2

HUMAN PARSING TECHNIQUES UTILIZING NEURAL NETWORK ARCHITECTURES

TECHNICAL FIELD

This disclosure is related to improved techniques for performing computer vision functions and, more particularly, to techniques that utilize trained neural networks and artificial intelligence (AI) algorithms to perform human parsing functions on images.

BACKGROUND

In the field of computer vision, human parsing functions are utilized to decompose humans depicted in images into semantic parts (e.g., arms, legs, head, etc.). Human parsing functions can be useful in a variety of contexts and applications. For example, performing human parsing functions on images can provide useful information for improving the performance of intelligent surveillance applications, fashion-related applications, and/or other applications that can benefit from ascertaining detailed parsing information related to humans depicted in images.

Accurately performing human parsing functions is a very complex and challenging task. To accurately perform automated human parsing, computer vision applications must account for a variety of technical problems. One technical problem relates to configuring and training a neural network architecture in an appropriate manner to enable human objects and corresponding semantic subcomponents (e.g., anatomical body parts) to be identified with high accuracy and precision. This can be difficult because the human objects and semantic subcomponents can vary greatly (e.g., such as in shape, pose, scale, color, etc.) across different images. Additional complexities can arise in scenarios in which the human objects and corresponding anatomical subcomponents are occluded or out of view.

BRIEF DESCRIPTION OF DRAWINGS

The patent or application file contains at least one drawing executed in color. Copies of this patent or patent application publication with color drawing(s) will be provided by the Office, upon request and payment of the necessary fee.

To facilitate further description of the embodiments, the following drawings are provided, in which like references are intended to refer to like or corresponding parts, and in which.

DETAILED DESCRIPTION OF EXEMPLARY EMBODIMENTS

Figure 1:
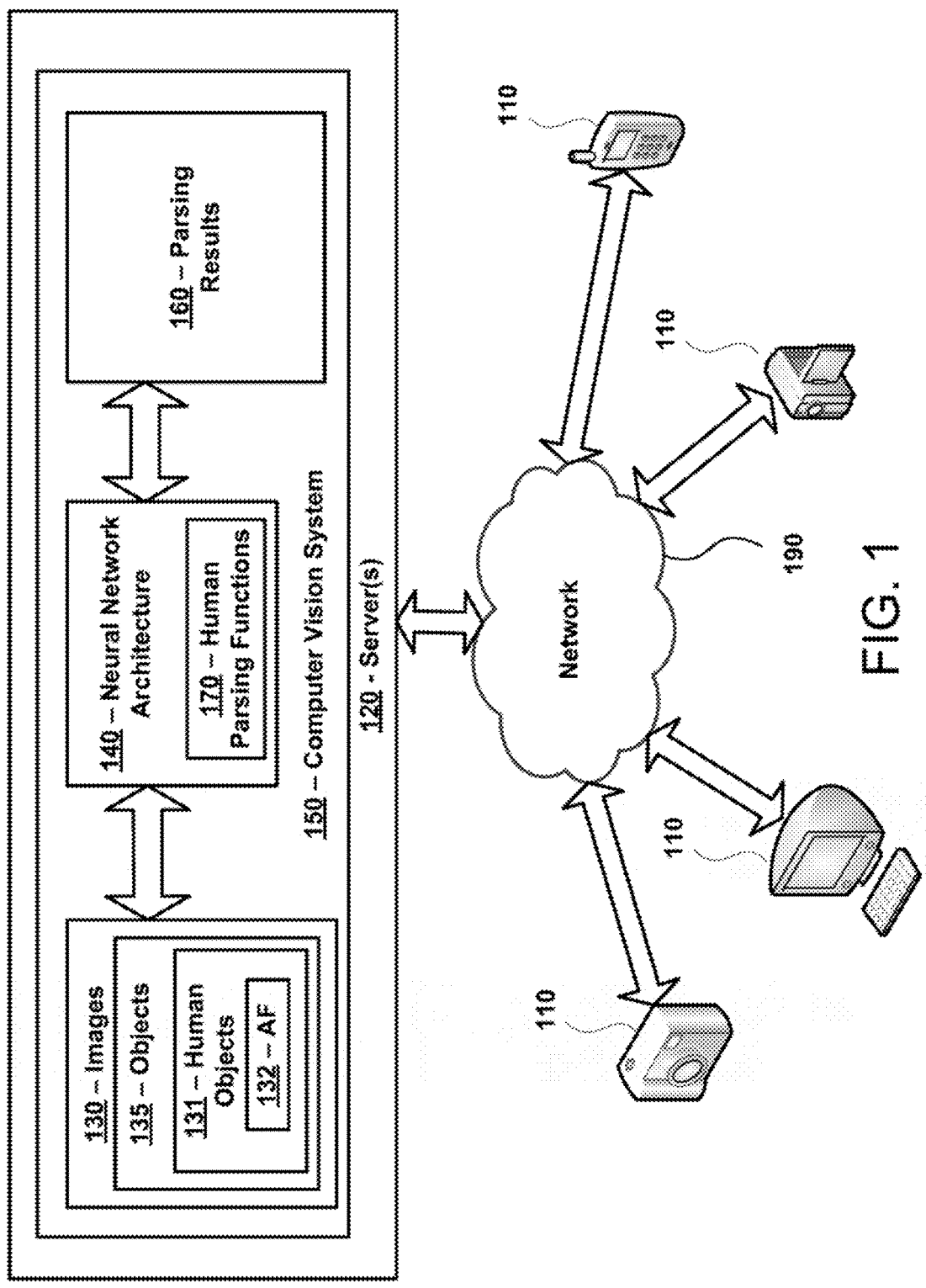
FIG. 1 is a diagram of an exemplary system in accordance with certain embodiments.

The present disclosure relates to systems, methods, and apparatuses that utilize improved techniques for performing computer vision functions including, but not limited to, human parsing functions. In certain embodiments, a computer vision system includes a neural network architecture that can be trained to perform the human parsing functions. The computer vision system can be configured to execute the human parsing functions on images to generate parsing results that identify precise locations of human objects and various anatomical features (e.g., heads, arms, torso, legs, feet, hands, upper bodies, lower bodies, etc.) associated with the human objects. As explained in further detail below, the accuracy of the human parsing functions may be improved by segmenting each human object at multiple levels, and utilizing cross-level information to generate the parsing results.

In certain embodiments, the neural network architecture models human objects using a hierarchal graph. The graph represents a human body as a multi-level hierarchy of interconnected nodes that correspond to anatomical features. For example, a first level of the hierarchal graph may include a node that represents a full human body, a second level may include nodes that represent anatomical features corresponding to upper and lower body portions, and a third level may include nodes that represent anatomical features of the upper and lower body portions (e.g., subcomponents corresponding to a head, legs, arms, hands, etc.). In some embodiments, additional levels may be included to identify more granular anatomical features (e.g., such as eyes, nose, hands, fingers, toes, etc.). The nodes of the hierarchal graph may interconnected with edges that identify relationships among the corresponding anatomical features (e.g., indicating that upper/lower body nodes in the second level are a subset of the full body node in the first level, arm nodes in the third level are a subset of the upper body node in the second level, leg nodes in the third level are a subset of the lower body node in the second level, etc.).

For at least a portion of the nodes included in the hierarchal graph, the neural network architecture may be configured to derive information using three inference or prediction processes: direct inference, bottom-up inference, and top-down inference. These inference or prediction processes can be utilized to predict multiple segmentation maps for each of the nodes included in the hierarchal graph. The neural network architecture can fuse or combine the predictions associated with each node to generate final parsing results for each node. The final predictions for each node can then be utilized to generate parsing results corresponding to the human object being modeled by the hierarchal graph. This process can be applied to each human object in an image to generate final parsing results for the image.

In certain embodiments, the direct inference information can be derived, at least in part, using a pre-existing backbone network or model (e.g., such as DeepLabV3, ResNet101, or other similar neural network) to predict a segmentation map for an anatomical feature (e.g., full body, upper body, arm, etc.) associated with each node included in the hierarchal graph. The direct inference information can be derived directly from raw image data associated with the images being analyzed.

The top-down inference information can be derived for any node in the hierarchal graph that includes a parent node. The top-down inference information can be derived, at least in part, by a top-down inference network that is configured to predict a segmentation map for an anatomical feature associated with a node using both contextual information from parent nodes and the direct inference information associated with the node. The contextual information from parent nodes, which can include information identifying an anatomical feature from a higher-level or more global view, can be useful for predicting more granular anatomical features associated with child nodes. For example, contextual information identifying an upper body and/or full body of a human object can be utilized to assist the human parsing network with identifying and parsing an arm of a human object.

The bottom-up inference information can be derived for any node in the hierarchal graph that includes one or more child nodes. The bottom-up inference information can be derived, at least in part, by a bottom-up inference network that is configured to predict a segmentation map for an anatomical feature associated with a node using both the contextual information from the one or more child nodes and the direct inference information associated with the node. The contextual information from child nodes, which can include information identifying more granular anatomical features, can be useful for predicting higher-level anatomical features. For example, contextual information identifying a leg of a human object can be utilized to assist the human parsing network with identifying and parsing a lower body and/or full body of the human object.

The direct inference, bottom-up inference, and top-down inference information generated for the nodes in the hierarchal graph can be fused to generate final predictions for the nodes. Parsing results can then be output for a corresponding image which decomposes the human objects in the image into various anatomical features with high precision and accuracy.

The manner in which the neural network architecture fuses the direct inference, bottom-up inference, and top-down inference information can vary. In certain embodiments, the neural network architecture may comprise a conditional fusion network that utilizes a gating function to estimate the confidence of each prediction (e.g., corresponding to the direct inference, bottom-up inference, and top-down inference information) derived for a node before fusing the predictions associated with the node. The confidence estimations can be utilized to determine how heavily each of the predictions derived for the node should be relied on in generating the final prediction for the node. The conditional fusion network can then combine the predictions utilizing the confidence estimations.

The parsing results generated by the neural network architecture can include any data or information associated with performing human parsing functions on images. The parsing results output by the neural network architecture can include, inter alia, augmented images (e.g., images that are augmented with lines or bounding boxes) identifying locations of human objects and/or anatomical features associated with the human objects. The segmentation results can also include other information that was generated during the parsing process (e.g., such as the confidence scores and/or prediction maps associated with any direct inference information, bottom-up inference information, and top-down inference information that was derived during the parsing process).

The technologies described herein can be used in a variety of different contexts and environments. Generally speaking, the technologies disclosed herein may be integrated into any application, device, apparatus, and/or system that can benefit from human parsing functions. In certain embodiments, the technologies can be incorporated directly into image capturing devices (e.g., video cameras, smart phones, cameras, etc.) to enable these devices to identify and segment target human objects and target anatomical features captured in videos or images. These technologies additionally, or alternatively, can be incorporated into systems or applications that perform post-processing operations on videos and/or images captured by image capturing devices (e.g., video and/or image editing applications that permit a user to alter or edit videos and images). These technologies can be integrated with, or otherwise applied to, videos and/or images that are made available by various systems (e.g., surveillance systems, facial recognition systems, fashion-related applications and platforms, social media platforms, etc.). The technologies discussed herein can also be applied to many other contexts as well.

In certain embodiments, the techniques applied herein can be adapted to perform parsing functions on non-human objects (e.g., such as other living objects and/or inanimate objects). For example, hierarchal graphs can be adapted to model animals, plants, structures (e.g., buildings, houses, etc.), vehicles, and/or other objects, and the neural network architecture can be adapted to derive and fuse direct inference, bottom-up inference, and top-down inference information over the nodes of the hierarchal graphs to produce parsing results that identify the objects and/or subcomponents of the objects.

Furthermore, the technologies described herein can be combined with other types of computer vision functions to supplement the functionality of the computer vision system. For example, in addition to performing parsing functions, the computer vision system can be configured to execute computer vision functions that classify objects or images, perform object counting, and/or perform other computer vision functions. The accuracy and precision of the technologies disclosed herein can aid in performing these and other computer vision functions.

As evidenced by the disclosure herein, the inventive techniques set forth in this disclosure are rooted in computer technologies that overcome existing problems in known computer vision systems, specifically problems dealing with human parsing functions. The techniques described in this disclosure provide a technical solution (e.g., one that utilizes various AI-based neural networking and machine learning techniques) for overcoming the limitations associated with known techniques. For example, the image analysis techniques described herein take advantage of novel AI and machine learning techniques to learn functions for deriving multiple predictions or inferences for segmenting target objects (e.g., human objects and/or anatomical features), and fusing the predictions or inferences to produce parsing results. This technology-based solution marks an improvement over existing capabilities and functionalities related to computer vision systems by improving the accuracy of the parsing functions and reducing the computational costs associated with performing such functions. Moreover, due to the configuration and use of fully convolutional networks (FCNs) and hierarchical graphs in certain embodiments, the techniques described herein can provide a unified, end-toend trainable framework with strong learning ability, improved representation power, and high processing speed.

In certain embodiments, a system is provided. The system includes one or more computing devices comprising one or more processors and one or more non-transitory storage devices for storing instructions, wherein execution of the instructions by the one or more processors causes the one or more computing devices to: receive, at a neural network architecture comprising a human parsing network, an image comprising at least one human object; utilize a hierarchal graph comprising a plurality of nodes to model the at least one human object, wherein the nodes correspond to anatomical features associated with a human body; generate inference information for the nodes in the hierarchal graph, wherein generating inference information includes: (i) deriving, with the neural network architecture, direct inference information for at least a portion of the nodes included in the hierarchal graph; (ii) deriving, with the neural network architecture, top-down inference information for at least a portion of the nodes included in the hierarchal graph; and (iii) deriving, with the neural network architecture, bottom-up inference information for at least a portion of the nodes included in the hierarchal graph; and generate, with the neural network architecture, parsing results based, at least in part, on the inference information associated with the nodes.

In certain embodiments, a method is provided. The method comprises: receiving, at a neural network architecture comprising a human parsing network, an image comprising at least one human object; utilizing a hierarchal graph comprising a plurality of nodes to model the at least one human object, wherein the nodes correspond to anatomical features associated with a human body; generating inference information for the nodes in the hierarchal graph, wherein generating inference information includes: (i) deriving, with the neural network architecture, direct inference information for at least a portion of the nodes included in the hierarchal graph; (ii) deriving, with the neural network architecture, top-down inference information for at least a portion of the nodes included in the hierarchal graph; and (iii) deriving, with the neural network architecture, bottom-up inference information for at least a portion of the nodes included in the hierarchal graph; and generating, with the neural network architecture, parsing results based, at least in part, on the inference information associated with the nodes.

In certain embodiments, a computer program product is provided. The computer program product comprises a non-transitory computer-readable medium including instructions for causing a computer to: receive, at a neural network architecture comprising a human parsing network, an image comprising at least one human object; utilize a hierarchal graph comprising a plurality of nodes to model the at least one human object, wherein the nodes correspond to anatomical features associated with a human body; generate inference information for the nodes in the hierarchal graph, wherein generating inference information includes: (i) deriving, with the neural network architecture, direct inference information for at least a portion of the nodes included in the hierarchal graph; (ii) deriving, with the neural network architecture, top-down inference information for at least a portion of the nodes included in the hierarchal graph; and (iii) deriving, with the neural network architecture, bottom-up inference information for at least a portion of the nodes included in the hierarchal graph; and generate, with the neural network architecture, parsing results based, at least in part, on the inference information associated with the nodes.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature, or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device), or may be a propagation medium. The medium may include a computer-readable storage medium, such as a semiconductor, solid state memory, magnetic tape, a removable computer diskette, a random access memory (RAM), a read-only memory (ROM), a programmable read-only memory (PROM), a static random access memory (SRAM), a rigid magnetic disk, and/or an optical disk, etc.

A data processing system suitable for storing and/or executing program code may include at least one processor coupled directly or indirectly to memory elements through a system bus. The at least one processor can include: one or more central processing units (CPUs), one or more graphical processing units (GPUs), one or more controllers, one or more microprocessors, one or more digital signal processors, and/or one or more computational circuits. The memory elements can include local memory employed during actual execution of the program code, bulk storage, and cache memories that provide temporary storage of at least some program code to reduce the number of times code is retrieved from bulk storage during execution. Input/output or I/O devices (including, but not limited to, keyboards, displays, pointing devices, etc.) may be coupled to the system, either directly or through intervening I/O controllers.

Network adapters may also be coupled to the system to enable the data processing system to become coupled to other data processing systems, remote printers, or storage devices through intervening private or public networks. Modems, cable modems, and Ethernet cards are just a few of the currently available types of network adapters.

FIG. 1 is a diagram of an exemplary system 100 in accordance with certain embodiments. The system 100 comprises one or more computing devices 110 and one or more servers 120 that are in communication over a network 190. A computer vision system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and computer vision system 150, can be configured to communicate directly with each other and/or over the network 190 via wired or wireless communication links, or a combination of the two. Each of the computing devices 110, servers 120, and computer vision system 150 can also be equipped with one or more transceiver devices, one or more computer storage devices (e.g., RAM, ROM, PROM, SRAM, etc.), and one or more processing devices (e.g., CPUs, GPUs, etc.) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110 and other devices over the network 190 (e.g., over the Internet).

In certain embodiments, the computer vision system 150 is stored on, and executed by, the one or more servers 120. The computer vision system 150 can be configured to perform any and all functions associated with analyzing images 130 and/or generating parsing results 160. This may include, but is not limited to, computer vision functions related to performing human parsing functions 170 (e.g., which may include identifying locations of human objects 131, and anatomical features 132 of the human objects 131, in the images 130) and/or other related functions. In certain embodiments, the parsing results 160 output by the computer vision system 150 can identify boundaries of human objects 131 and/or their anatomical features 132 (e.g., anatomical features) with pixel-level accuracy.

The images 130 provided to, and analyzed by, the computer vision system 150 can include any type of image. In certain embodiments, the images 130 can include one or more two-dimensional (2D) images. In certain embodiments, the images 130 may additionally, or alternatively, include one or more three-dimensional (3D) images. The images 130 may be captured in any digital or analog format and may be captured using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc. In certain embodiments, the images 130 may be obtained from, or associated with, videos or video sequences. In certain embodiments, pre-processing functions can be applied to the images 130 to adapt the images 130 to a format that can assist the computer vision system 150 with analyzing the images 130.

The images 130 received by the computer vision system 150 can be captured by any type of image capturing device. The image capturing devices can include any devices that are equipped with an imaging sensor, camera, and/or optical device. For example, the image capturing device may represent still image cameras, video cameras, and/or other devices that include image/video sensors. The image capturing devices can also include devices that perform other functions unrelated to capturing images. For example, the image capturing device can include mobile devices (e.g., smart phones or cell phones), tablet devices, computing devices, desktop computers, and/or other devices that are equipped with an imaging sensor, camera, and/or optical device. The image capturing devices can be equipped with analog-to-digital (A/D) converters and/or digital-to-analog (D/A) converters based on the configuration or design of the camera devices. In certain embodiments, the computing devices 110 shown in FIG. 1 can include any of the aforementioned image capturing devices and/or other types of image capturing devices.

The images 130 provided to the computer vision system 150 can depict, capture, or otherwise correspond to any type of scene. For example, the images 130 provided to the computer vision system 150 can include images 130 that depict natural scenes, indoor environments, and/or outdoor environments. Each of the images 130 (or the corresponding scenes captured in the images 130) can include one or more objects 135. Generally speaking, any type of object 135 may be included in an image 130, and the types of objects 135 included in an image 130 can vary greatly. The objects 135 included in an image 130 may correspond to various types of living objects (e.g., human beings, animals, plants, etc.), inanimate objects (e.g., beds, desks, windows, tools, appliances, industrial equipment, curtains, sporting equipment, fixtures, vehicles, etc.), structures (e.g., buildings, houses, etc.), and/or the like.

Some or all of the images 130 received by the computer vision system 150 can include one or more human objects 131. A human object 131 may represent, or correspond to, a portion of picture that depicts a human body or portion of a human body. For each human object 135, various anatomical features 132 (labeled "AF" in FIG. 1) may be captured or depicted in an image 130. For example, an image 130 that captures a front view of an entire human body may depict anatomical features 132 including a head, arms, legs, stomach, etc. Likewise, an image 130 that captures a rear view of a human upper body may depict anatomical features 132 including a head, shoulders, back, etc.

In this disclosure, the term "anatomical features" can refer to portions of a human body at multiple levels. For example, from a global level, an anatomical feature 132 may refer to a full human body. From a more granular level, anatomical features 132 may represent upper and lower body portions of a human body. From an even more granular level, anatomical features 132 may represent legs, arms, heads, torso, and other parts of a human body. From an even more granular level, anatomical features 132 may represent hands, feet, fingers, toes, upper arm, lower arm, upper leg, lower leg, and other parts of a human body. Thus, anatomic components 132 can refer to human bodies, and subcomponents thereof, at various granular levels.

The images 130 received by the computer vision system 150 can be provided to the neural network architecture 140 for processing and/or analysis. In certain embodiments, the neural network architecture 140 may comprise a convolutional neural network (CNN), or a plurality of convolutional neural networks. Each CNN may represent an artificial neural network (e.g., that is inspired by biological processes), and may be configured to analyze images 130, and to execute deep learning functions and/or machine learning functions on the images 130. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers enable the CNNs to learn and execute various functions for analyzing, interpreting, and understanding the images 130 including, but not limited to human parsing functions 170. Exemplary configurations of the neural network architecture 140 are discussed in further detail below.

In certain embodiments, the neural network architecture 140 can be trained to perform one or more computer vision functions to analyze the images 130. For example, the neural network architecture 140 can analyze an image 130 to perform human parsing functions 170, which may include identifying and segmenting locations of the human objects 131 and anatomical features 132, and/or other types of object parsing functions. The neural network architecture 140 can additionally analyze the images 130 to perform other computer vision functions (e.g., object classification, object counting, and/or other functions).

In certain embodiments, the human parsing functions 170 executed by the neural network architecture 140 are configured to parse or segment each detected human object 131 into various anatomical features 132. In certain embodiments, the human parsing functions 170 parse or segment a human object 131 into various anatomical features 132 at a plurality of different levels. For example, the human parsing functions 170 may parse or segment a human object 131 at a first global level to identify an anatomic component 132 that comprises an entire body of the human object 131 (or the entire portion of the body which is visible in the image 130), a second level which identifies anatomical features 132 corresponding to an upper and lower body portions, and a third, more-fine grained level which identifies anatomical features 132 corresponding to particular body parts (e.g., head, upper leg, lower leg, lower arm, upper arm, etc.). As explained in further detail below, in certain embodiments, the neural network architecture 140 utilizes multi-level contextual information derived across the nodes of the hierarchical graph to improve the accuracy of the parsing results 160 generated by the neural network architecture 140.

The neural network architecture 140 of the computer vision system 150 can be configured to generate and output parsing results 160 based on an analysis of the images 130. The parsing results 160 for an image 130 can generally include any information or data associated with analyzing, interpreting, and/or identifying objects 135 and/or object subcomponents included in the images 130. For example, the parsing results 160 may include information that identifies the results associated with performing the human parsing functions 170 and/or other parsing functions executed by the computer vision system 150.

In certain embodiments, the parsing results 160 can include information that indicates whether or not one or more human objects 131 and/or one or more anatomical features 132 were detected in each of the images 130. The parsing results 160 can include data that indicates the locations of any detected human objects 131 and their corresponding anatomical features 132 in each of the images 130. For example, the parsing results 160 for an image 130 can include an annotated version of an image 130, which identifies each of the human objects 131 included in the image, and which includes lines or annotations surrounding the perimeters, edges, or boundaries of the human objects 131. Similarly, the parsing results 160 for an image 130 can include an annotated version of an image 130, which identifies anatomical features 132 of each human object 131 included in the image, and which includes lines or annotations surrounding the perimeters, edges, or boundaries of the anatomical features 132. In some cases, each of the anatomical features 132 may be highlighted using a different color to facilitate easy identification of the anatomical features 132. The parsing results 160 can include other types of data or information for identifying the locations of the human objects 131 and anatomical features 132 (e.g., such as coordinates of the human objects 131 and anatomical features 132 and/or masks identifying locations of human objects 131 and anatomical features 132). Other types of information and data can be included in the parsing results 160 output by the neural network architecture 140 as well.

In certain embodiments, the neural network architecture 140 can be trained to perform these and other computer vision functions using any supervised, semi-supervised, and/or unsupervised training procedure. In certain embodiments, the neural network architecture 140, or portion thereof, is trained using a supervised or semi-supervised training procedure. In certain embodiments, the neural network architecture 140 can be trained using training images that are annotated with pixel-level ground-truth information in certain embodiments. One or more loss functions may be utilized to guide the training procedure applied to the neural network architecture 140.

In the exemplary system 100 of FIG. 1, the computer vision system 150 may be stored on, and executed by, the one or more servers 120. In other exemplary systems, the computer vision system 150 can additionally, or alternatively, be stored on, and executed by, the computing devices 110 and/or other devices. The computer vision system 150 can additionally, or alternatively, be integrated into an image capturing device that captures one or more of the images 130, thus enabling image capturing device to analyze the images 130 using the techniques described herein. Likewise, the computer vision system 150 can also be stored as a local application on a computing device 110, or integrated with a local application stored on a computing device 110 to implement the techniques described herein. For example, in certain embodiments, the computer vision system 150 can be integrated with (or can communicate with) various applications including, but not limited to, surveillance applications, fashion-related applications, social media applications, image/video editing applications, and/or other applications that are stored on a computing device 110 and/or server 120.

In certain embodiments, the one or more computing devices 110 can enable individuals to access the computer vision system 150 over the network 190 (e.g., over the Internet via a web browser application). For example, after an image capturing device has captured one or more images 130, an individual can utilize the image capturing device or a computing device 110 to transmit the one or more images 130 over the network 190 to the computer vision system 150. The computer vision system 150 can analyze the one or more images 130 using the techniques described in this disclosure. The parsing results 160 generated by the computer vision system 150 can be transmitted over the network 190 to the image capturing device and/or computing device 110 that transmitted the one or more images 130.

Figure 2:
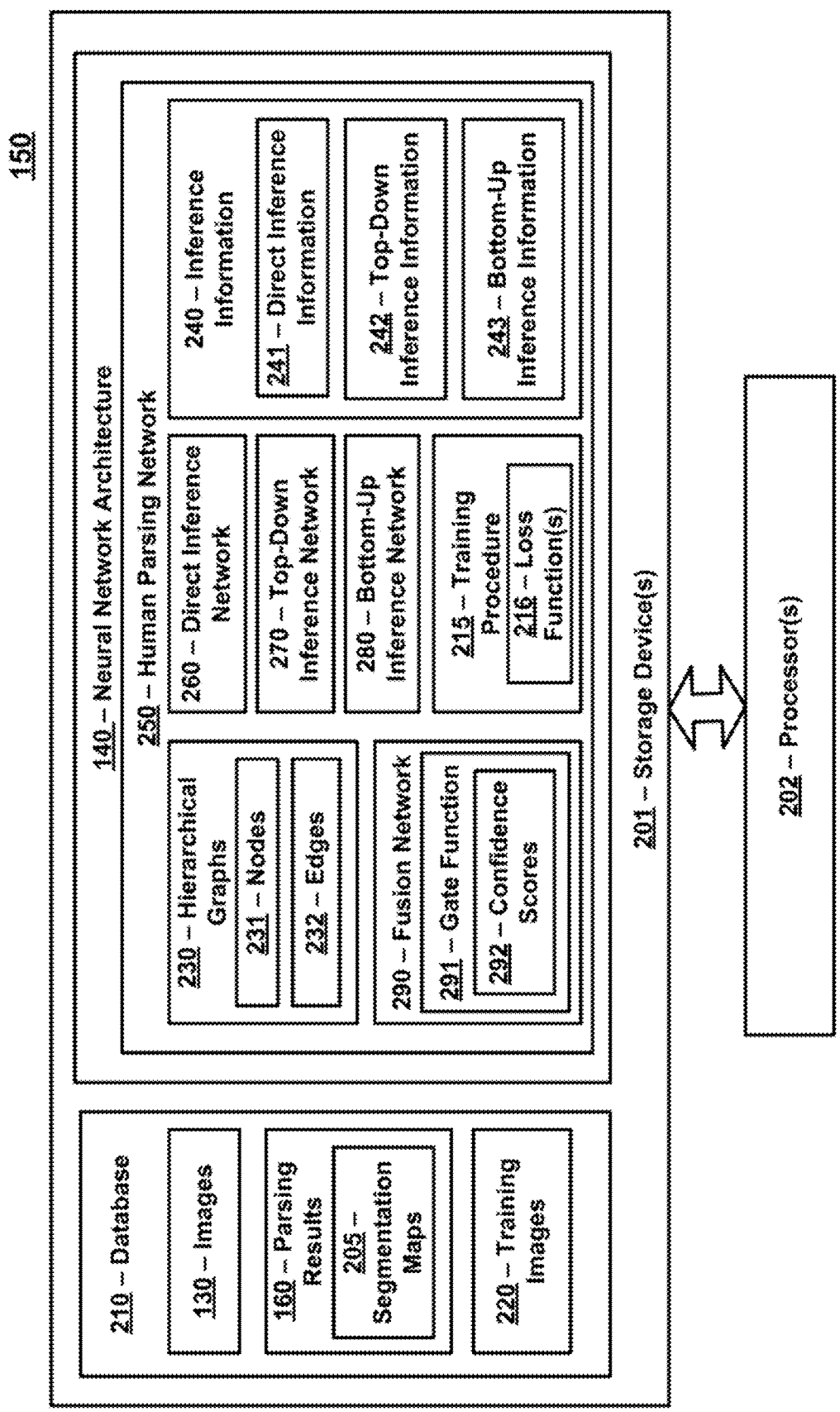
FIG. 2 is a block diagram of an exemplary computer vision system in accordance with certain embodiments.

FIG. 2 is a block diagram of an exemplary computer vision system 150 in accordance with certain embodiments. The computer vision system 150 includes one or more storage devices 201 that are in communication with one or more processors 202. The one or more storage devices 201 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more graphical processing units (GPUs), central processing units (CPUs), controllers, microprocessors, digital signal processors, and/or computational circuits. The one or more storage devices 201 can store data and instructions associated with one or more databases 210 and a neural network architecture 140 that comprises a parsing network 250. The one or more processors 202 are configured to execute instructions associated with these components and associated subcomponents. Each of these components and subcomponents are described in further detail below.

The database 210 stores the images 130 that are provided to and/or analyzed by the computer vision system 150, as well as the parsing results 160 (e.g., which may comprise segmentation maps 205) that are generated by the computer vision system 150. The database 210 also stores a set of training images 220 that are utilized to train the neural network architecture 140. Although not shown in FIG. 2, the database 210 can store any other data or information mentioned in this disclosure including, but not limited to, direct inference information 241, top-down inference information 242, bottom-up inference information 243, confidence scores 292, etc.

The human parsing network 250 associated with the neural network architecture 140 can be trained to perform human parsing functions 170 and other computer vision functions. In certain embodiments, the human parsing network 250 includes a direct inference network 260, top-down inference network 270, bottom-up inference network 280, and fusion network 290 that enable the neural network architecture 140 to assist with performing the human parsing functions 170. The configurations and implementations of the neural network architecture 140, including the human parsing network 250, direct inference network 260, top-down inference network 270, bottom-up inference network 280, and fusion network 290, can vary.

In certain embodiments, the human parsing network 250 is configured to utilize or generate hierarchical graphs 230, each of which comprises a plurality of nodes 231 and a plurality of edges 232, to model human objects 131 in the images 130. The edges 232 may connect the nodes 231 in a hierarchical fashion using child-parent relationships. For example, a node 231 at the top of the hierarchy may represent an entirety of the human object 131 from a global view, and each subsequent layer of child nodes 231 included in the graph may identify anatomical features 132 of the human object 131 with increasing granularity. Each node 231 that is connected to a parent node in an upper layer of the hierarchy represents an anatomical feature 131 that is a subset or subcomponent of the parent node in the upper layer. Similarly, each node 231 that is connected to a child node in a lower layer of the hierarchy represents an anatomical feature 131 that includes the features of the child node in the lower layer.

In certain embodiments, a hierarchical graph 230 may comprise three or more tiers of nodes 231 that can be used to model a human body or human object 231. For example, a first tier of a hierarchical graph 230 may include a single node 231 that represents an entire human body or human object 231. A second tier of the hierarchical graph 230 may include a pair of nodes 231 that represent anatomical features 132 corresponding to an upper body portion and lower body portion of the human body or human object 231. The nodes 231 in the second tier may be connected to the node 231 in the first tier using edges 232 that indicate that the nodes 231 in the second tier are subcomponents of node 231 in the first tier. A third tier of the hierarchical graph 230 may include a plurality of nodes 231 corresponding to anatomic components 132 that are sub-features of the nodes in the second tier (e.g., sub-features that correspond to a head, torso, upper arm, lower arm, upper leg, lower leg, etc.). Each node 231 in the third tier may be connected to one of nodes 231 in the second tier using an edge 232 which indicates that the node 231 in the third tier is a sub-feature of the node 231 in the second tier. For example, third-tier nodes 231 corresponding to upper and lower leg regions may be connected to the node 231 in the second tier that corresponds to the lower body portion of the human body or human object 231, and third-tier nodes 231 corresponding to the head, torso, upper arm, and lower arm regions may be connected to the node 231 in the second tier that represents the upper body portion of the human body or human object 231. In certain embodiments, additional tiers of child nodes can be connected or added to the hierarchical graph 230 to model more granular anatomical features 132 as well.

A hierarchical graph 230 can be utilized to model and parse each human object 131 that is included in an image 130. In certain embodiments, for each human object 131, the direct inference network 260, top-down inference network 270, and bottom-up inference network 280 separately generate inference information 240 for nodes 231 included in the hierarchical graph 230. The inference information 240 generated by these networks for a node 231 may include segmentation maps 205 and/or other information that predicts the location of the anatomical feature 132 associated with node 231.

For example, for a node 231 situated at the pinnacle of the hierarchical graph 230, direct inference information 241 and bottom-up inference information 243 may be generated that includes a pair of segmentation maps 205, each of which predicts a location of the entire human object 131 using a separate inference process. Similarly, for a middle or second tier node 231 that represents an upper body of a human object 131, direct inference information 241, top-down inference information 243, and bottom-up inference information 243 may be generated that includes three segmentation maps 205, each of which predicts a location of the upper body using a separate inference process. Likewise, for a third-tier node 231 that represents a head of the human object 131, direct inference information 241 and top-down inference information 243 may be generated that includes a pair of segmentation maps 205, each of which predicts a location of the upper body using a separate inference process. For each node, a fusion network 290 receives the inference information 240 generated for the node 231 and uses the inference information 240 to generate a final prediction for the node 231. The final predictions over all the nodes 231 can be combined to generate parsing results 160 for the human object 131.

The direct inference network 260 can be configured to generate direct inference information 241 for each node 231 included in a hierarchical graph 230. The direct inference information 241 generated by the direct inference network 260 for a node 231 can include a segmentation map 205 that is generated at least in part, using a pre-trained model, such as such as DeepLab (e.g., DeepLabV3 or other version), ResNet (e.g., ResNet101 or other version), or other similar neural network.

The top-down inference network 270 can be configured to generate top-down inference information 242 for each node 231 in a hierarchical graph 230 that includes one or more parent nodes. The top-down inference information 242 for a node 231 may include a segmentation map 205 that is derived, at least in part, using the direct inference information 241 associated with the node 231 and contextual information from one or more parent nodes. The contextual information from parent nodes can include information identifying one or more anatomical features 132 associated with a human object 131 from a more global view, which can be utilized by the top-down inference network 270 to predict the location of the more granular anatomical feature 132 associated with the node 231 being analyzed. In certain embodiments, the top-down inference network 270 may be implemented, at least in part, using a fully convolutional network (FCN).

The bottom-up inference network 280 can be configured to generate bottom-up inference information 243 for each node 231 in a hierarchical graph 230 that includes one or more child nodes. The bottom-up inference network 280 may include a segmentation map 205 that is derived, at least in part, using the direct inference information 241 generated by the direct inference network 260 and contextual information from one or more child nodes. The contextual information from child nodes can include information identifying more granular anatomical features associated with a human object 131, which can be utilized by the bottom-up inference network 280 to predict the location of the more global anatomical feature 132 associated with the node 231 being analyzed. In certain embodiments, the bottom-up inference network 280 may be implemented, at least in part, using a FCN.

In certain embodiments, a fusion network 290 receives the inference information 240 generated for each node 231 included in a hierarchical graph 230, and utilizes this information to generate final predictions or segmentation maps for the nodes 231. This can include execution a function that combines or fuses the inference information 240 generated for each node. The final predictions or segmentation maps for each node 231 can then be combined to produce parsing results for the human object 131 and/or image 130 that includes the human object 131. The process of parsing a human object 131 can be repeated if more than one human object 131 is captured in an image. After parsing processes are performed over all human objects 131 in an image, final parsing results for an image 130 can be output. In certain embodiments, the fusion network 290 may be implemented, at least in part, using a FCN.

In certain embodiments, the fusion network 290 may utilize a gate function 291 to estimate confidence scores 292 for the direct inference information 241, the top-down inference information 242, and the bottom-up inference information 243 derived for the nodes 231. The confidence scores 292 may indicate the trustworthiness of the predictions associated with the direct inference information 241, the top-down inference information 242, and the bottom-up inference information 243. For example, the confidence scores 292 may represent a metric that that indicates the quality of the predictions and/or indicates the quality of how well the anatomical feature 132 is represented by the predictions. The confidence scores can be utilized by the gate function 291 to determine how heavily each of the three predictions should be relied on in generating the final prediction or segmentation map for each node. The fusion network 290 can utilize the confidence scores 292 derived for each node to generate the final predictions or segmentation maps for the nodes. This enables less trustworthy prediction information to be utilized to a lesser extent (or not used entirely), and enables more trustworthy prediction information to be utilized to a greater extent.

The training images 220 stored in the database 210 can be utilized in connection with a training procedure 215 to train the human parsing network 250, including the direct inference network 260, top-down inference network 270, bottom-up inference network 280, and fusion network 290. The training procedure 215 utilized to train the human parsing network 250 can vary. In certain embodiments, the training procedure 270 may include a semi-supervised or supervised training procedure 270 that utilizes the training images 220 and corresponding annotation information to train the human parsing network 250 and associated subcomponents.

The training images 220 can include various types of annotation information to assist with such training. For example, in certain embodiments, the annotation information can include pixel-level labels and/or pixel-level annotations identifying the boundaries and locations of human objects 131 and anatomical features 132 in each of the training images 220. The annotation information can additionally, or alternatively, include image-level and/or object-level annotations identifying the human objects 131 and anatomical features 132 in each of the training images 220. In certain embodiments, some or all of the training images 220 may be obtained from one more public datasets, e.g., such as the ImageNet dataset, PASCAL-Person-Part dataset, Look into Person (LIP) dataset, Active Template Regression (ATR) dataset, Pedestrian Parsing on Surveillance Scenes (PPSS) dataset, Fashion Clothing dataset, and/or other similar datasets.

In certain embodiments, the training procedure 215 executed by the neural network architecture 140 can utilize one or more loss functions 216 to optimize the human parsing network 250, including the direct inference network 260, top-down inference network 270, bottom-up inference network 280, and fusion network 290. Any appropriate loss function 216 can be utilized to train and optimize these modules. In certain embodiments, the direct inference network 260, top-down inference network 270, bottom-up inference network 280, and fusion network 290 are trained with a loss function 216 that includes a cross-entropy loss. Further details regarding exemplary training procedures 215 and loss functions 216 are described in further detail below.

It should be apparent that the computer vision system 150 described herein can be adapted to perform parsing functions to identify objects 135 included in a wide variety of images 130. Thus, while certain portions of the disclosure herein may describe embodiments that involve performing parsing functions on human objects 131, it would be apparent to one of ordinary skill in the art that such embodiments can be adapted to perform parsing functions on other types of objects 135.

Exemplary embodiments of the computer vision system 150 and the aforementioned sub-components (e.g., the database 210, neural network architecture 140, human parsing network 250, direct inference network 260, top-down inference network 270, bottom-up inference network 280, and fusion network 290) are described in further detail below. While the sub-components of the computer vision system 150 may be depicted in FIG. 2 as being distinct or separate from one another, it should be recognized that this distinction may be a logical distinction rather than a physical or actual distinction. Any or all of the sub-components can be combined with one another to perform the functions described herein, and any aspect or feature that is described as being performed by one sub-component can be performed by any or all of the other sub-components. Also, while the sub-components of the computer vision system 150 may be illustrated as being implemented in software in certain portions of this disclosure, it should be recognized that the sub-components described herein may be implemented in hardware and/or software.

Figure 3:
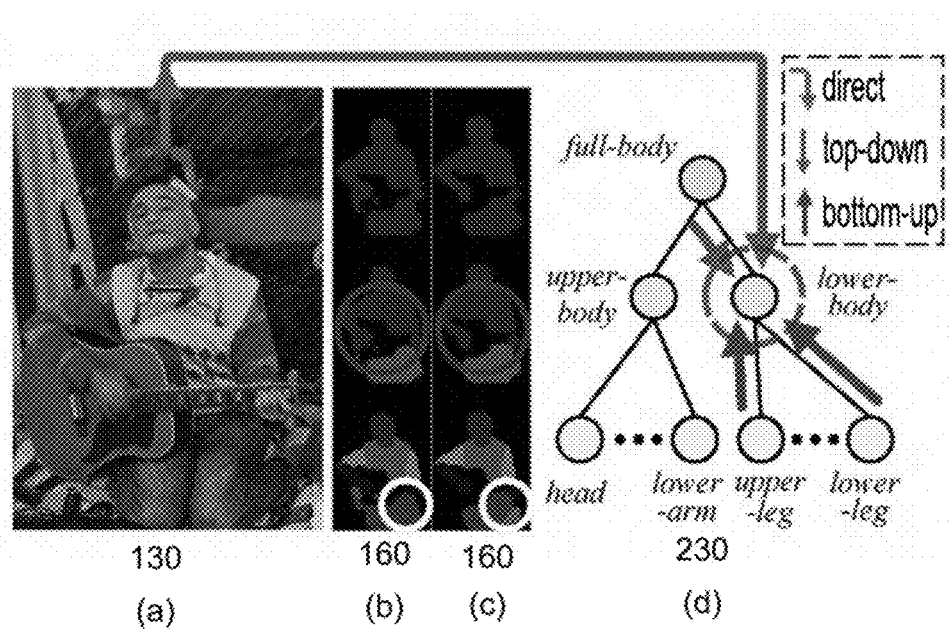
FIG. 3 a diagram illustrating an exemplary technique for performing human parsing functions in accordance with certain embodiments.

FIG. 3 is a diagram 300 illustrating an exemplary technique for performing human parsing functions 170 on an image 130. Section (a) illustrates an exemplary image 130 that includes a single human object 131. Section (b) illustrates exemplary parsing results 160 that are based on direct inference processes only. Section (c) illustrates exemplary parsing results 160 that are generated by a parsing network 250 that fuses multi-level level information. Section (d) illustrates an exemplary hierarchical graph 230 that is utilized to model a human body associated with the human object 131 and to generate the parsing results illustrated in section (c).

The exemplary hierarchical graph 230 in section (d) comprises three tiers of nodes 231. A first tier includes a single node corresponding to full body of the human object 131. A second tier includes child nodes corresponding to upper and lower body portions of the human object 131. A third tier comprises leaf nodes corresponding sub-features of the upper and lower body portions of the human object 131 (e.g., such a head portion, lower-arm portion, upper leg portion, lower-leg portion, etc.). The edges connecting the first tier node to the second tier nodes indicate that the anatomical features 132 associated with the second tier nodes are part of the anatomical feature 132 associated with the first tier node. Likewise, the edges connecting the second tier nodes to the third tier nodes indicate that the anatomical features 132 associated with the third tier nodes are part of the anatomical feature 132 associated with the connected second tier node.

In this manner, the human parsing network 250 can represent the human body as a hierarchy of multi-level semantic parts, and can perform human parsing functions 170 using a multi-source information fusion process. For each node 231, inference information 240 from at least two of the direct inference network 260, top-down inference network 270, and bottom-up inference network 280 can be combined or fused to better capture the structure of a corresponding anatomical feature 132. The nodes in the second tier can benefit from all three sources of inference information.

In section (d), the second tier node corresponding to the lower-body portion is circled to demonstrate how inference information can be utilized. A first arrow shows that direct inference information 241 may be obtained directly from the image 130 itself (e.g., using a pre-trained model). A second arrow shows that top-down inference information 242 may be obtained, at least in part, using contextual information obtained from the full-body node in the first tier. A third arrow shows that bottom-up inference information 243 may be obtained, at least in part, using contextual information from the third tier nodes (e.g., the nodes corresponding to an upper-leg portion, lower-leg portion, and/or other anatomical sub-features included in the lower-body portion).

The parsing results 160 in sections (b) and (c) each show three segmentation maps 205. The parsing results 160 in section (c) better capture the structures of the anatomical features 132 associated with the human object 131 in comparison to the parsing results 160 in section (b), which only relies on direct inference processes. The circles added to the lower two segmentation maps 205 in sections (b) and (c) highlight these improvements.

Figure 4:
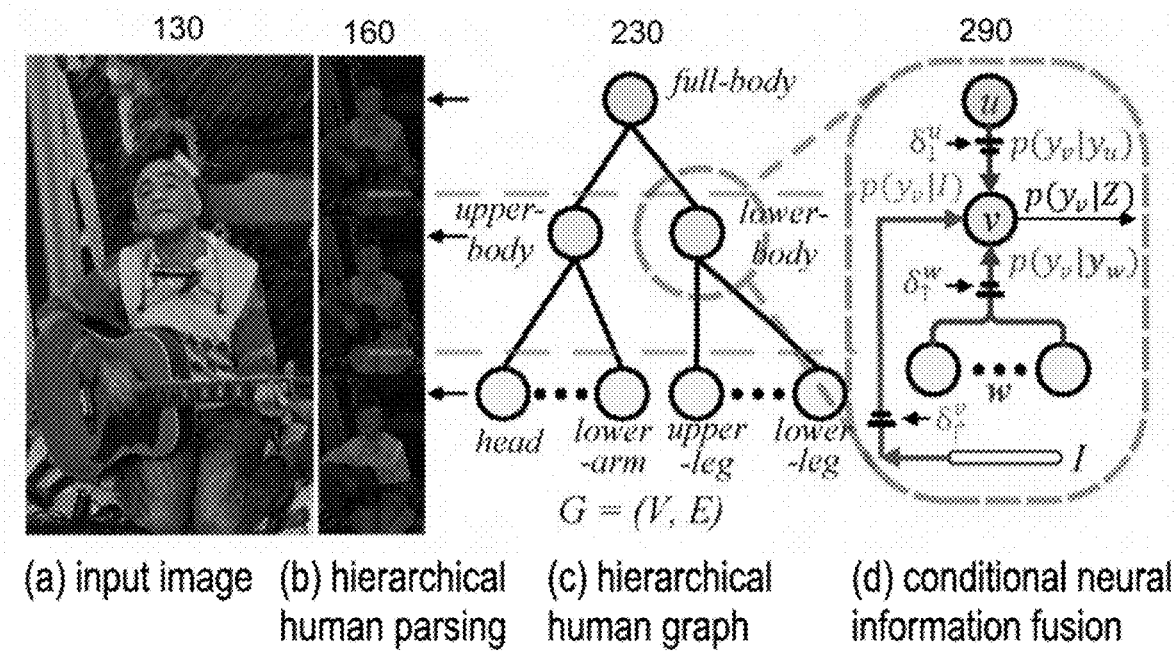
FIG. 4 a diagram illustrating an exemplary technique for performing human parsing functions in accordance with certain embodiments.

FIG. 4 is a diagram 400 further illustrating an exemplary technique for performing human parsing functions 170 on an image 130. Similar to FIG. 3, section (a) illustrates an exemplary image 130 that includes a single human object 131. Section (b) illustrates exemplary parsing results 160 that are generated by a parsing network 250 that fuses multi-level information, and section (c) illustrates an exemplary hierarchical graph 230 that is utilized to model a human body associated with the human object 131 and to generate the parsing results illustrated in section (b). Section (d) additionally shows a portion of an exemplary fusion network 290 that may be utilized to fuse the multi-level information associated with the lower-body node to generate the parsing results 160 in section (b). The notations show in sections (c) and (d) of the diagram 400 are discussed in further detail below.

The hierarchical human body structure can be represented as a graph $\mathcal{G} = (\mathcal{V}, \varepsilon, \mathcal{Y})$, where nodes $v \in \mathcal{V}$ represent human parts in different levels, and edges $e \in \varepsilon$ are two tuples $e = (u, v)$ representing the composition relation that node $v$ is a part of node $u$. As shown in section (c) of FIG. 4, the nodes may be further grouped into L(=3) levels: $\mathcal{V} = \mathcal{V}^1 \cup \ldots \cup \mathcal{V}^L$ where $\mathcal{V}^1$ are the leaf nodes (the most fine-grained semantic parts of this exemplary hierarchical graph 230), $\mathcal{V}^2 = \{\text{upper-body, lower-body}\}$, and $\mathcal{V}^3 = \{\text{full-body}\}$. For each node $v$, a segmentation map $\mathcal{Y}_v \in \mathcal{Y}$ can be inferred that is a probability map of its label. Because higher-level annotations can be obtained by simply combining the lower-level labels, it is not necessary to introduce any additional annotations.

Three different sources of information may be used to infer $\mathcal{Y}_v$ for $v$: 1) the raw input image; 2) $\mathcal{Y}_u$ for the parent node $u$, and 3) $\mathcal{Y}_{\mathcal{Y}_w}$ for all the child nodes $\mathcal{Y}_w$. The final prediction of $\mathcal{Y}_v$ can be viewed as a fusion of the information from these three sources.

A brief review of different approaches to model this information fusion problem is provided before describing a particular approach and network design that may be preferable for certain embodiments of the parsing network 250. However, it should be noted that the particular approach and network design incorporated into the parsing network 250 can be varied or adapted to include all or any of these or other approaches.

Information fusion refers to the process of combining information from several sources $Z = \{z_1, z_2, \ldots, z_n\}$ in order to form a unified picture of the measured/predicted target $\mathcal{Y}$. Each source provides an estimation of the target. These sources can be the raw data $x$ or some other quantities that can be inferred from $x$. Several approaches are described below.

A first approach is to use a product of experts (PoE) fusion, which treats each source as an "expert." This approach multiplies the probabilities and then renormalizes in the following manner:

$$p(\mathcal{Y}|Z) = \frac{\prod_{i=1}^{n} p(\mathcal{Y}|z_i)}{\sum_{\mathcal{Y}} \prod_{i=1}^{n} p(\mathcal{Y}|z_i)}. \quad (1)$$

A second approach is to use Bayesian fusion. Denoting $Z_s = \{z_1, z_2, \ldots, z_s\}$ as the set of the first s sources, this approach factorizes the posterior probability as follows:

$$p(\mathcal{Y}|Z) = \frac{p(z_n|\mathcal{Y})p(\mathcal{Y})}{p(Z_n)} = \frac{p(\mathcal{Y})p(z_1|\mathcal{Y})\prod_{S=2}^{n}p(z_{S-1},\mathcal{Y})}{p\left(z_1\prod_{S=2}^{n}p(Z_S|z_{S-1})\right)}. \quad (2)$$

However, with this second approach, it may be too difficult to learn all the conditional distributions. By assuming independence of different information sources, this provides Naive Bayes, which serves as an approximation to the true distribution, as follows:

$$p(\mathcal{Y}|Z) \propto p(\mathcal{Y})\Pi_i p(z_i|\mathcal{Y}), \quad (3).$$

A third approach is to use ensemble methods. In this approach, each $z_i$ is a classifier that predicts $\mathcal{Y}$. One exemplary ensemble method is Bayesian voting, which weights the prediction of each classifier to get the final prediction as follows:

$$p(\mathcal{Y}|Z) = \Sigma_z p(y|Z_1)p(z_i|x) \quad (4).$$

A fourth approach is to use graphical models (e.g., conditional random fields). In such models, each $z_i$ can be viewed as a node that contributes to the conditional probability as follows:

$$pe(y/Z) = \exp\{\Sigma_i \phi\theta_i(y,zi) - A(\theta)\}, \quad (5)$$

wherein $A(\theta)$ is the log-partition function that normalizes the distribution.

With the fourth approach, computing $A(\theta)$ is often intractable. Thus, the solution may be obtained by approximation methods, such as Monte Carlo methods or (loopy) belief propagation methods.

The above approaches can all be viewed as ways to approximate the true underlying distribution $p(\mathcal{Y}|Z)$, which can be written as a function of predictions from different information sources $z$:

$$p(\mathcal{Y}|Z) = f(p(y|z_1), p(y|z_2), \ldots, p(y|z_n)). \quad (6).$$

There are potential drawbacks to each of the above options. One drawback is that they are not entirely consistent with each other. For example, the PoE multiplies all $p(y\backslash z_i)$ together, whereas ensemble methods compute their weighted sum. Each option approximates the true distribution in a different way and has its own tradeoff. In addition, exact inference is difficult and solutions are often approximative (e.g., contrastive divergence may be used for PoE and Monte Carlo methods for graphical models).

In certain embodiments, instead of following the above-described approaches, the parsing network 250 may leverage neural networks to directly model this fusion function, due to their strong ability of flexible feature learning and function approximation. The parsing network 250 can directly learn to fuse multi-source information for a specific task.

In the compositional structure g, the final prediction p(y $\mathcal{V}$|Z) for each node $\mathcal{V}$ can combine information from three different sources: 1) the direct inference p(y $\mathcal{V}$|x) from the raw image input (e.g., the direct inference information 241 generated by the directed inference network 260); 2) the top-down inference p(y $\mathcal{V}$|y$_u$) from the parent node u which utilizes the decomposition relation (e.g., the top-down inference information 242 generated by the top-down inference network 270); and 3) the bottom-up inference p(y $\mathcal{V}$|y$_w$) which assembles predictions y$_w$ for all the child nodes w to leverage the composition relation (e.g., the bottom-up inference information 243 generated by the bottom-up inference network 280). Because simply fusing different estimations could be problematic, the fusion of the information sources may be conditioned on the confidence of each information source.

To this end, the human parsing network can be designed to learn a compositional neural information fusion:

$$p(y_v|Z) = f(\delta_\rightarrow^v p(y_v\backslash x), \delta_\downarrow^v p(y_v\backslash y_u), \delta_\uparrow^w p(y_v\backslash y_w)), \quad (7)$$

wherein the confidence $\delta$ is a learnable continuous function with outputs from 0 to 1, and symbols $\rightarrow$, $\downarrow$, and $\uparrow$ denote direct, top-down, and bottom-up inference, respectively.

As shown in section (d) of FIG. 4, this function fuses information from the three sources in the compositional structure, taking into account the confidence of each source. For neural network realizations of this function, the probability terms can be relaxed to logits, e.g., log-probabilities.

Because the top-down and bottom-up inferences rely on an estimation of the parent and child node(s), respectively, the human parsing network 250 may be designed in a manner that accounts for a circular dependency between a parent node and its children node. To solve this, the direct inference result derived from the raw image data can be treated as an initial estimation, and the top-down and bottom-up inferences may rely on this initial estimation. Thus, in certain embodiments, the algorithm executed by the human parsing network 250 can be decomposed into three consecutive steps:

1) Direct inference: Given the raw data as input, an estimation ỹ $\mathcal{V}$ can be assigned to the each node u∈ $\mathcal{V}$;

2) Top-down/bottom-up inference: p(y $\mathcal{V}$\ỹ$_u$) and p(y$_u$\ỹ$_w$)) can be estimated based on the estimated ỹ$_u$ and ỹ$_w$ in step 1; and 3) Conditional information fusion: Based on the above results, a final prediction can be obtained for each node $\mathcal{V}$ as follows:

$$y_v^* = \text{argmax}_y f(\delta_\rightarrow^v p(y_v\backslash x), \delta_\downarrow^v p(y_v\backslash y_u), \delta_\uparrow^w p(y_v\backslash y_w)).$$

In certain embodiments, this procedure can motivate the overall network architecture, and each of the above steps can be learned by a neural network. Details regarding an exemplary network design are discussed below.

Figure 5:
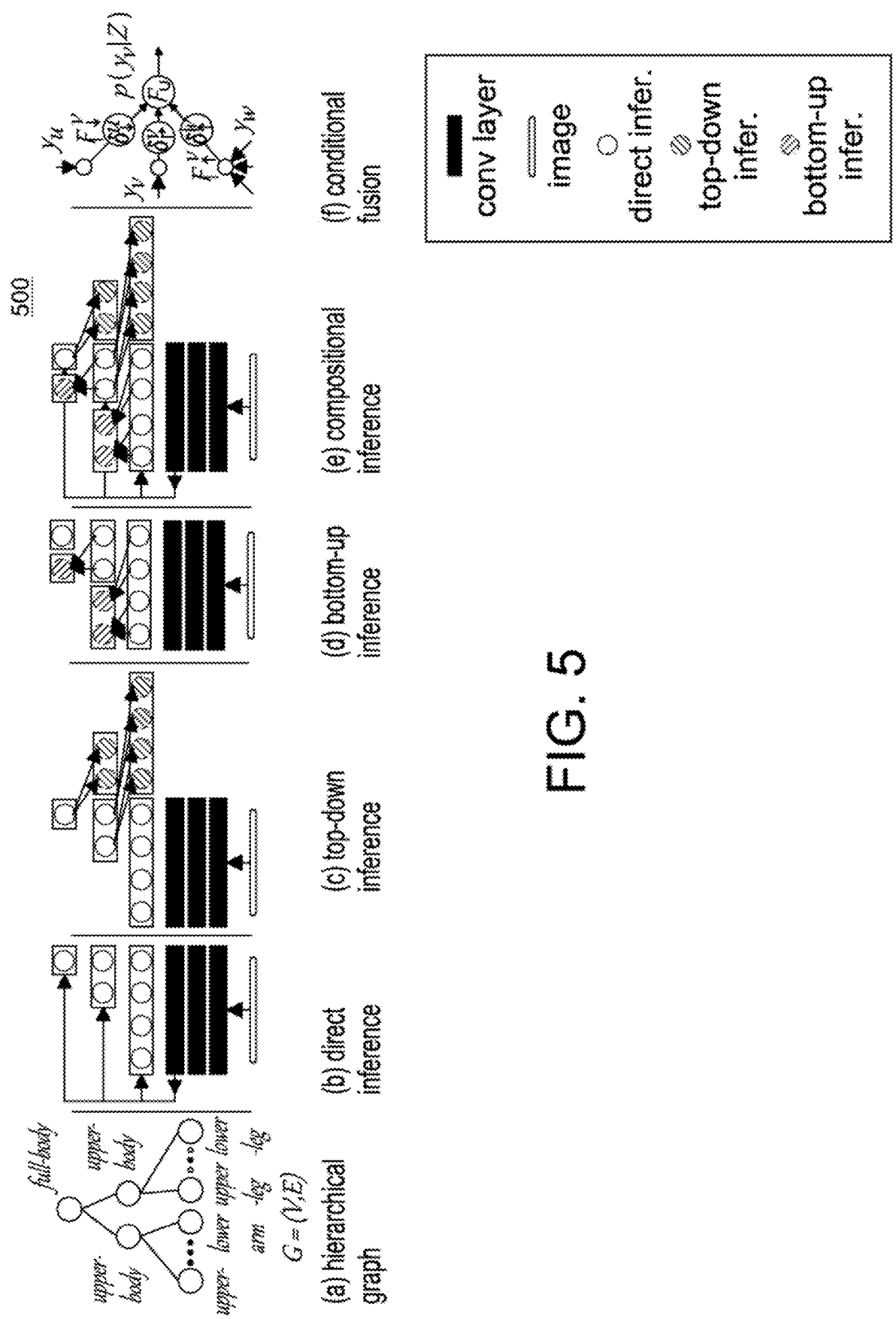
FIG. 5 is a diagram illustrating an exemplary technique for fusing multi-level inference information to obtain parsing results in accordance with certain embodiments.

FIG. 5 is a diagram 500 illustrating exemplary implementation details of a human parsing network 250. Section (a) illustrates an exemplary hierarchical graph 230 that may be utilized to model a human body or human objects 131 depicted in images 130. Section (b) discloses exemplary implementation details for a direct inference network 260 that is configured to generate direct inference information 241 corresponding to human objects 131 captured in images 130. Section (c) discloses exemplary implementation details for a top-down inference network 270 that is configured to generate top-down inference information 242 corresponding to human objects 131 captured in images 130. Section (d) discloses exemplary implementation details for a bottom-up inference network 280 that is configured to generate bottom-up inference information 243 corresponding to human objects 131 captured in images 130. Section (e) discloses exemplary implementation details for a fusion network 290 that is configured to generate parsing results 160 based on the direct inference information 241, top-down inference information 242, and/or bottom-up inference information 243. Section (f) discloses exemplary implementation details for a conditional fusion process that may be executed by fusion network 290.

The model utilized to implement the human parsing network 250 can stack the components shown in this figure to form an end-to-end system for hierarchical human parsing. The human parsing network 250 does not require any preprocessing. Moreover, because the modules can be implemented using FCNs, the human parsing network 250 is able to achieve a high efficiency.

An exemplary direct inference network 260 is disclosed in section (b) of FIG. 5. The direct inference network 260 can be configured to directly predict a segmentation map $\tilde{y}_u$ for each node $\mathcal{V}$ (a human part or anatomical feature 132), using information from an image 130. Given an input image $I \in \mathbb{R}^{K \times K \times 3}$, a backbone network B (e.g., a DeepLabV3-like network, parameterized by $W_B$) can be utilized to obtain a new effective image representation $h_I$ as follows:

$$\text{(image embedding)} \ h_I = F_B(I; W_B) \in \mathbb{R}^{k \times k \times c} \qquad (8).$$

As the nodes $\mathcal{V}$ capture explicit semantics, a specific feature $h_v$ for each node $v$ is desired for more efficient representation. However, using several different, node-specific embedding networks may lead to high computational cost. To remedy this, for each l-th level, a level-specific FCN (LSF) can be used to describe level-wise semantics and contextual relations as follows:

$$\text{(level-specific embedding)} \ h_{LSF}^l = F_{LSF}^l(h_I; W_{LSF}^l) \in \mathbb{R}^{k \times k \times c}, \qquad (9)$$

wherein $l \in \{1,2,3\}$.

More specifically, three LSFs ($F_{LSF}^1$, $F_{LSF}^2$, and $F_{LSF}^3$) can be learned to extract three level-specific embeddings ($h_{LSF}^1$, $h_{LSF}^2$, and $h_{LSF}^3$). Further, for each node $v$, an independent channel-attention block, e.g., such as a Squeeze-and-Excitation (SE) block, can be applied to obtain its specific feature as follows:

$$\text{(node-specific embedding)} \ h_v = F_{SE}^v(h_{LSF}^l; W_{SE}^v) \in \mathbb{R}^{k \times k \times c}, \qquad (10)$$

wherein $v \in \mathcal{V}^l$ (i.e., $v$ is located in the l-th level).

By explicitly modeling interdependencies between channels, $F_{SE}^v$ allows the system to adaptively recalibrate channel-wise features of $h_{LSF}^l$ to generate node-wise representations. In addition, due to its light-weight nature, this goal can be achieved with minimal computational overhead. The direct inference network $F_{\dot{P}}$ can then read the feature and predicts the segmentation $\tilde{y}_v$ map as follows:

$$\text{logit}(\tilde{y}_v|I) = F_{\dot{P}}(h_v; W_{\dot{P}}) \in \mathbb{R}_{\geq 0}^{k \times k}. \qquad (11).$$

An exemplary top-down inference network 270 is disclosed in section (c) of FIG. 5. The top-down inference network 270 can predict segmentation maps considering human decompositional structures based on the outputs from the direct inference network 260. Specifically, for node $v$, the top-down inference network $F_\downarrow$ can leverage the initial estimation $\tilde{y}_u$ of its parent node u as high-level contextual information for prediction as follows:

$$\text{Logit}(\mathcal{Y}_v|\tilde{\mathcal{Y}}_u) = F_\downarrow(\mathcal{Y}_v|\tilde{\mathcal{Y}}_u, h_v, W_\downarrow) = ([\tilde{\mathcal{Y}}_u, h \mathcal{V}]) \in \mathbb{R}_{\geq 0}^{k \times k}. \qquad (12).$$

Here, the concatenated feature $[\tilde{\mathcal{Y}}_u, h \mathcal{V}]$ may be fed into the FCN-based $F_\uparrow$, which is parameterized by $W_\downarrow$ for top-down inference.

An exemplary bottom-up inference network 280 is disclosed in section (d) of FIG. 5. One difference between the top-down inference network 270 and the bottom-up inference network 280 is that, for each node $v$, the bottom-up inference network 280 may need to gather information (i.e., $\tilde{\mathcal{Y}} \mathcal{Y}_w \in \mathbb{R}_{\geq 0}^{k \times k \times |\mathcal{Y}_w|}$) from multiple descendants $\mathcal{Y}_w$. Due to the composition relations between $\mathcal{Y}_w$ and $v$, $\tilde{\mathcal{Y}} \mathcal{Y}_w$ can be transformed to a fixed one-channel representation $\tilde{\mathcal{Y}} \mathcal{Y}_w$ through position-wise max-pooling (PMP) across channels as follows:

$$\tilde{\mathcal{Y}} \mathcal{Y}_w = \text{PMP}([\tilde{\mathcal{Y}} \mathcal{Y}_w] \mathcal{Y}_w \in \mathcal{Y}_w) \in \mathbb{R}_{\geq 0}^{k \times k \times 1}, \qquad (13)$$

wherein [·] is a concatenation operation;

Then, the bottom-up inference network $F_\uparrow$ can generate a prediction according to composition relations as follows:

$$\text{logit}(\tilde{\mathcal{Y}}_w \mathcal{V}_l \tilde{\mathcal{Y}}_w]_{w \in w_w}) = F_\uparrow(\tilde{\mathcal{Y}}_w \mathcal{V}_l$$
$$\tilde{\mathcal{Y}}_w]_{w \in w_w; h} \mathcal{V}, W_\uparrow) = F_\uparrow([\tilde{\mathcal{Y}}_w]_{w \in w_w; h}$$
$$\mathcal{V}_l) \in \mathbb{R}_{\geq 0}^{k \times k} \qquad (14).$$

An exemplary fusion network 280 is disclosed in section (e) of FIG. 5. Before making the final prediction, the confidence $\delta$ of each information source can be estimated using a neural gate function. For the direct inference of a node $\mathcal{V}$, the confidence can be estimated as follows:

$$\delta_{\dot{P}}^v = \sigma(C_{\dot{P}}^v \cdot \text{CAP}(h \ \mathcal{V})) \in [0,1], \qquad (15)$$

wherein $\sigma$ is the sigmoid function, and CAP is a channel-wise average pooling function.

The channel-wise average pooling (CAP) function is a simple, yet effective, way for capturing the global statistics in convolutional features. $C_{\dot{P}}^u \in \mathbb{R}^{1 \times C}$ indicates a small fully connected layer that maps the C-dimension statistic vector $\text{CAP}(h \mathcal{V}) \in \mathbb{R}^C$ of $h \mathcal{V}$ into a confidence score 292.

The confidence scores 292 for the top-down and bottom-up inference processes can follow a similar computational framework:

$$\delta_\downarrow^u = \sigma(C_\downarrow^u \cdot \text{CAP}(h_u)) \in [0,1],$$
$$\delta_\uparrow^w = \sigma(C_\uparrow^w \cdot \text{CAP}([h_w]w \in w)) \in [0,1] \qquad (16)$$

wherein $C_\downarrow^u \in \mathbb{R}^{1 \times C}$ and $C_\uparrow^w \in \mathbb{R}^{1 \times C|w|}$.

For the bottom-up inference process, a concatenation can be used to combine all the child node embeddings $[h_w]_{w \in w} \in \mathbb{R}^{k \times k \times C[w]}$ and the decision can be made upon the confidence over the union of the child nodes. Here, the confidence of a source can be viewed as a global score or statistic for interpreting the quality of the feature, which can be learned in an implicit manner.

For each node $\mathcal{V}$, the fusion network $F_\cup$ can combine the results from the three inference networks for final prediction as follows:

$$\text{logit}(y \ \mathcal{V}|Z) = F_\cup(\delta_{\dot{P}}^v F_{\dot{P}}^v, \delta_\downarrow^u F_\downarrow \mathcal{V}, \delta_\uparrow^w V_\uparrow \mathcal{V}; W_\cup) \in \mathbb{R}_{\geq 0}^{k \times k \times 1}, \qquad (17)$$

wherein $F_\cup: \mathbb{R}_{\geq 0}^{k \times k \times 3} \to \mathbb{R}_{\geq 0}^{k \times k \times 1}$ is implemented by a small FCN, parameterized by $W_\cup$.

Figure 6:
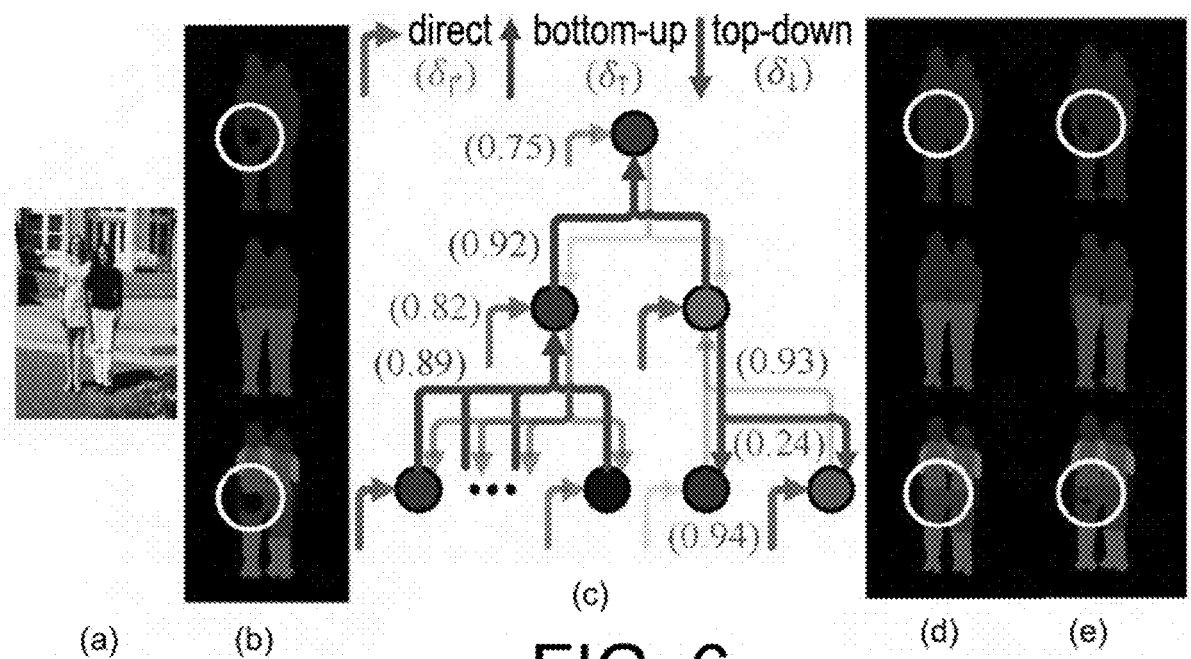
FIG. 6 is a diagram illustrating a fusion process that may be executed by a human parsing network in accordance with certain embodiments.

FIG. 6 is a diagram 600 illustrating an exemplary fusion process that may be executed by a human parsing network 250 in accordance with certain embodiments. Section (a) illustrates an exemplary image 130 that may be received as an input to a human parsing network 250. Section (b) discloses an exemplary segmentation or parsing map 241 that may be included in inference information 241 generated by a direct inference network 240. Section (c) discloses an exemplary conditional information fusion process that may be executed by the fusion network 290. In section (c), the arrows with darker colors indicate higher values of gates δ, and gate values are shown for a few inference processes in (•). Section (d) discloses exemplary parsing results 160 that may generated by fusing various sources of inference information 240 and applying a gate function 291 which applies confidence scores 292 to the inference information being fused. Section (e) discloses exemplary parsing results 160 that may generated by fusing various sources of inference information 240 without applying a gate function 291 and, instead, applying a weight-fixed fusion function. The circles included in sections (d) and (e) demonstrate the improvements that can be provided by the gate function 291 described herein.

As illustrated in section (c) of FIG. 6, δ provides a learnable gate function 291 that suggests how much information can be used from each source of inference information 240 (e.g., the direct inference information 241, top-down inference information 242, and/or bottom-up inference information 243). It is able to dynamically change the amount of the information used in different inference processes. As demonstrated by a comparison of the parsing results 160 illustrated in sections (d) and (e), it yields better results than statically fusing the information with a weight-fixed fusion function.

Any appropriate loss function 216 can be utilized to assist with training the human parsing network 250. In certain embodiments, a softmax function can be applied over the logits of nodes in the same level to obtain the final segmentation map from logit($y \mathcal{V}|Z$). Thus, for each level, all the inference networks ($F_\Gamma$, $F_\downarrow$, $F_\uparrow$) and the fusion network $F_\cup$ can be trained by a cross-entropy loss as follows:

$$\mathcal{L}^l = \mathcal{L}_\Gamma^{CE} + \mathcal{L}_\downarrow^{CE} + \mathcal{L}_\uparrow^{CE} + \mathcal{L}_\cup^{CE}. \qquad (18)$$

Figure 7:
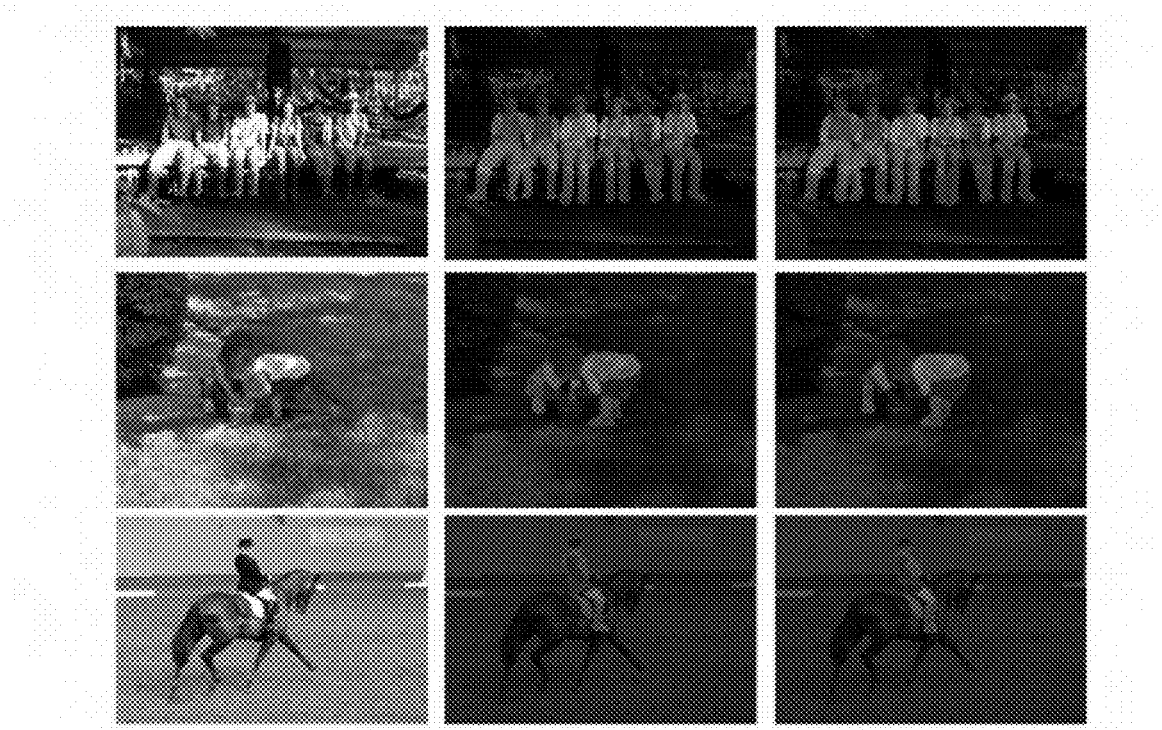
FIG. 7 is a chart that illustrating exemplary parsing results that may be generated by a human parsing network in accordance with certain embodiments.

FIG. 7 is a chart 700 that discloses exemplary parsing results 160 that may be generated by the human parsing network 250. In particular, column (a) of the chart shows three exemplary input images 130 that may be received by the human parsing network 250. Column (b) shows the images 130 in column (a) annotated with ground-truth annotations that identify the human objects 131 and their corresponding anatomical features 132 with pixel-level precision. Column (c) of the chart shows exemplary parsing results 160 that are generated by an exemplary embodiment of the human parsing network 250. A comparison of the images in columns (b) and (c) demonstrate the effectiveness of the techniques described herein.

The specific implementation details of the human parsing network 250 can vary across embodiments. In certain embodiments, the backbone network or feature extraction network $F_B$ (e.g., used Equation 8 above), which may be included in or communicate with the direct inference network 260, uses the convolutional blocks of ResNet101 and the stride can be set to 16 (e.g., the resolution of the output is set to 1/16 of that of the input) for high computation efficiency. In addition, an Atrous Spatial Pyramid Pooling (ASPP) module can be applied for extracting more effective features with multi-scale context. The ASPP-enhanced feature can be compressed by a 1×1 convolutional layer with ReLU activation. The compressed 512-d feature can be further ×2 upsampled and element-wisely added with the feature from the second convolutional block of ResNet101, to encode more spatial details. Thus, given an input image I with a size of K×K, the feature extraction network B can produce a new image representation $h_I$ $$\in \mathbb{R}^{\frac{K}{8} \times \frac{K}{8} \times 512}.$$

In addition, with respect to the direct inference network 260, $F_{LSF}^l$ (e.g., used in Equation 9 above) can be implemented with a 3×3 convolutional layer with Batch Normalization (BN) and ReLU activation, and the parameters can be shared by all the nodes located in the l-th level. This can be used for extracting specific features $\{h_{LSF}^1, h_{LSF}^2, h_{LSF}^3\}$ for the three semantic-levels. For each node v, an independent Squeeze-and-Excitation (SE) block, $F_{SE}^v$ in Equation 10, can further be applied to extract its specific embedding $h_v$ $$\in \mathbb{R}^{\frac{K}{8} \times \frac{K}{8} \times 512}$$

with an extremely light-weight architecture. Then, $F_\Gamma$, in Equation 11, can be implemented by a stack of three 1×1 convolutional layers.

The architecture of the top-down inference network $F_\downarrow$, (e.g., used in Equation 12) and bottom-up interference network $F_\uparrow$ (e.g., used in Equation 14) are similar, but differ in their strategies of processing the input features (see Equation 13). Both can be implemented by three cascaded convolutional layers, with convolution sizes of 3×3, 3×3 and 1×1, respectively. For the information fusion network 290, $F_\cup$ in Equation 17 can be comprised of three 1×1 convolutional layers with ReLU activations for non-linear mapping.

Testing and/or training images may be obtained from one or more of the following public datasets: ImageNet dataset, PASCAL-Person-Part dataset, LIP dataset, ATR dataset, PPSS dataset, Fashion Clothing dataset, and/or other similar datasets.

For the training procedure 215, the weights of the backbone network can be loaded from ResNet101 which is pre-trained on ImageNet, and the remaining layers can be randomly initialized. Data augmentation techniques can be applied on some or all the training images 220 to expand the training dataset. The data augmentation techniques can apply random scaling, cropping and left-right flipping. The random scale can be set from 0.5 to 2.0, while the crop size can be set to 473×473. For optimization, a stochastic gradient descent (SGD) can be adopted with a momentum of 0.9, and weight decay of 0.0005. For the learning rate, a "poly"-learning rate schedule can be used $$lr = \text{base\_lr} \times \left(1 - \frac{iters}{total\_iters}\right)^{power},$$

in which power=0.9 and base_size=0.007. The total_iters cn be set to epochs×batch_size, where base_size=40 and epochs=150. In certain embodiments, multiple GPUs may be used for the consumption of large batch size, and Synchronized Cross-GPU BN may be implemented.

For the testing phase, the per-pixel classification scores can be averaged at multiple scales with flip, e.g., the scale can be set to 0.5 to 1.5 (in increments of 0.25) times the original size. The human parsing network 250 does not require any other pre-processing or post-processing steps and, thus, can achieve a processing speed of 23.0 frames per second (fps), which is faster than any other known deep human parsers.

In certain embodiments, the human parsing network 250 can be implemented on PyTorch and trained on one or more processors 202 (e.g., four NVIDIA Tesla V100 GPUs with a 32 GB memory per-card). All the testing procedures can be executed on one or more processors 202 (e.g., a single NVIDIA TITAN Xp GPU with 12 GB memory). Extensive ablation and qualitative comparisons and experiments were conducted using an exemplary implementation of the human parsing network 250, which demonstrate the superiority of the present techniques over other known human parsers and the ability of the human parsing network 250 to capture human semantics from a more comprehensive view.

Figure 8:
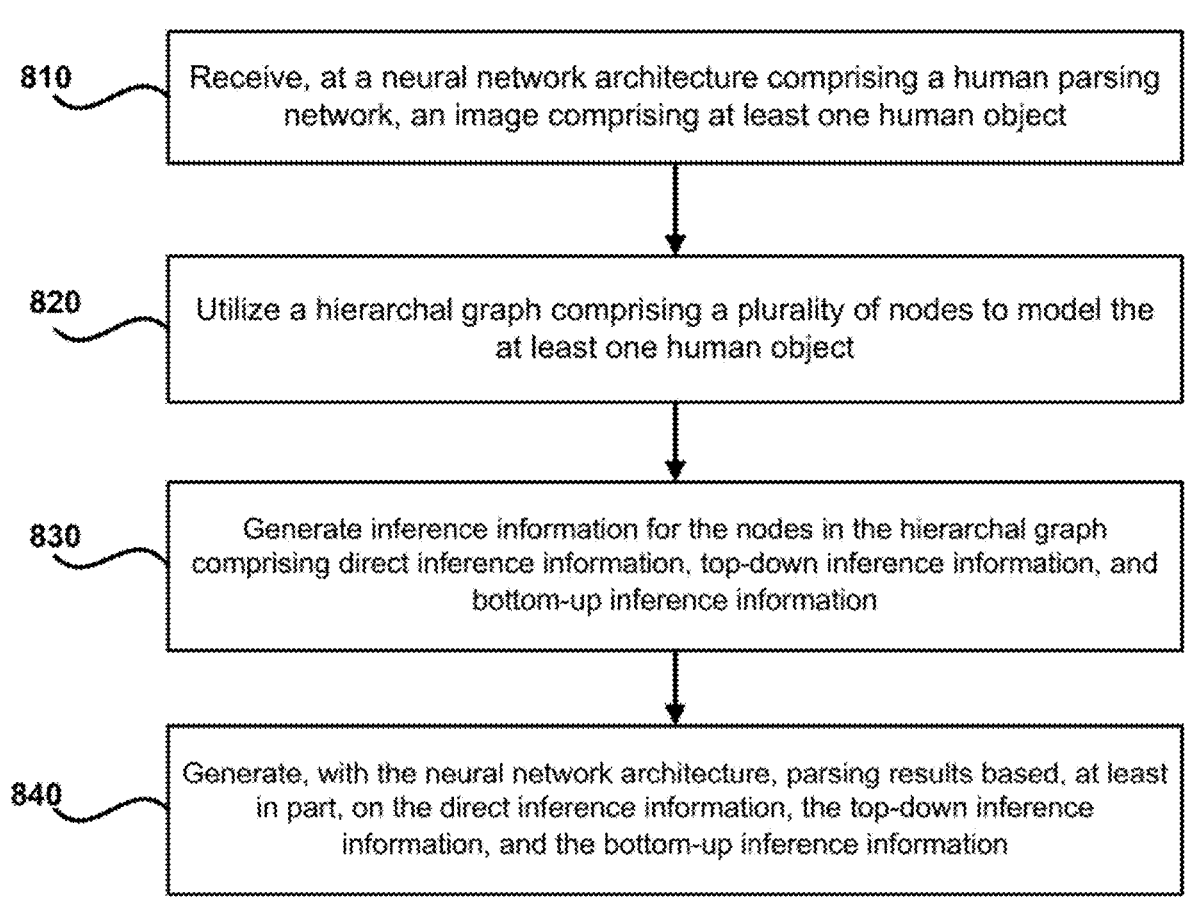
FIG. 8 is a flow chart of an exemplary method according to certain embodiments.

FIG. 8 illustrates a flow chart for an exemplary method 800 according to certain embodiments. Method 800 is merely exemplary and is not limited to the embodiments presented herein. Method 800 can be employed in many different embodiments or examples not specifically depicted or described herein. In some embodiments, the steps of method 800 can be performed in the order presented. In other embodiments, the steps of method 800 can be performed in any suitable order. In still other embodiments, one or more of the steps of method 800 can be combined or skipped. In many embodiments, system 100, computing device 110, sever 120, computer vision system 150, neural network architecture 140, and/or human parsing network 250 can be suitable to perform method 800 and/or one or more of the steps of method 800. In these or other embodiments, one or more of the steps of method 800 can be implemented as one or more computer instructions configured to run on one or more processing modules (e.g., processor 202) and configured to be stored at one or more non-transitory memory storage modules (e.g., storage device 201). Such non-transitory memory storage modules can be part of a computer system, such as system 100, computing device 110, sever 120, computer vision system 150, neural network architecture 140, and/or human parsing network 250.

At step 810, an image 130 comprising at least one human object 131 is received at a neural network architecture 140 comprising a human parsing network 250.

At step 820, a hierarchal graph 230 comprising a plurality of nodes 231 is utilized to model the at least one human object 131. The manner in which the hierarchal graph 230 is utilized to model the at least one human object can vary. In certain embodiments, the nodes may be arranged in a hierarchy such that a root node located in a top or first layer represents an entirety of a human body, and lower layers includes nodes 231 representing subcomponents of the human body with increasing granularity with each subsequent layer. For example, the hierarchal graph 230 may include: a root node in a first tier that corresponds to a full human body; a pair of nodes in a second tier which represent an upper body portion and lower body portion of a human body; and a plurality of leaf nodes in a third tier which correspond to anatomical subcomponents (e.g., head, right arm, left arm, right leg, left leg, etc.) of the upper and lower body portions of the human body. The hierarchal graph 230 may model a human object or human body in other ways as well, and the anatomical features 132 associated with each of the nodes 231 can vary.

At step 830, inference information is generated for the nodes in the hierarchal graph 230 comprising direct inference information 241, top-down inference information 242, and bottom-up inference information 243. In certain embodiments, direct inference information 241 can be generated for all of the nodes 231 included in the hierarchal graph 230, top-down inference information 242 can be generated for each node 231 in the hierarchal graph 230 that is connected to at least one parent node, and bottom-up inference information 243 can be generated for each node 231 in the hierarchal graph 230 that is connected to at least one child node.

At step 840, parsing results 160 are generated by the neural network architecture 140 based, at least in part, on the direct inference information 241, the top-down inference information 242, and the bottom-up inference information 243. In certain embodiments, a fusion network 290 combines or fuses the information inference information 240 derived for each of the nodes 231 to obtain final predictions (e.g., segmentation maps 205) for each of the nodes 231. The final predictions associated with the nodes 231 may then be combined to produce parsing results 160 for the at least one human object 131. The neural network architecture 140 may output the parsing results 160 (e.g., by outputting an annotated version of the image which identifies boundaries of the at least one human object 131 and its corresponding anatomical features 132).

While various novel features of the invention have been shown, described and pointed out as applied to particular embodiments thereof, it should be understood that various omissions, substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system comprising:
    one or more computing devices comprising one or more processors and one or more non-transitory storage devices for storing instructions, wherein execution of the instructions by the one or more processors causes the one or more computing devices to:
        receive, at a neural network architecture comprising a human parsing network, an image comprising at least one human object;
        utilize a hierarchal graph comprising a plurality of nodes to model the at least one human object, wherein the nodes correspond to anatomical features associated with a human body;
        generate inference information for the nodes in the hierarchal graph, wherein generating inference information includes:

deriving, with the neural network architecture, direct inference information for each of the nodes included in the hierarchal graph;

deriving, with the neural network architecture, top-down inference information for at least a portion of the nodes included in the hierarchal graph; and deriving, with the neural network architecture, bottom-up inference information for at least a portion of the nodes included in the hierarchal graph; and generate, with the neural network architecture, parsing results based, at least in part, on the inference information associated with the nodes.

2. The system of claim 1, wherein:

the neural network architecture comprises a fusion network; and for each node included in the hierarchal graph, the fusion network combines or fuses the inference information derived for the node to obtain a final prediction for the node.

3. The system of claim 2, wherein:

the fusion network includes a gating function that is configured to compute confidence scores associated with the direct inference information, the top-down inference information, and the bottom-up inference information; and the confidence scores are utilized to determine an extent to which the direct inference information, the top-down inference information, and the bottom-up inference information are utilized to generate the final prediction for the node.

4. The system of claim 2, wherein final predictions for the nodes are combined to generate the parsing results for the at least one human object.

5. The system of claim 1, wherein the hierarchal graph utilized to model the at least one human object comprises:

a top tier node that corresponds to an entirety of the at least one human object;

second tier nodes that correspond to an upper body portion and lower body portion of the at least one human object; and third tier nodes that correspond to anatomical subcomponents of the upper body portion and the lower body portion of the at least one human object.

6. The system of claim 1, wherein:

the neural network architecture comprises a direct inference network; and the direct inference network is configured to generate the direct inference information directly from raw data associated with the image.

7. The system of claim 1, wherein:

the neural network architecture comprises a top-down inference network; and the top-down inference network is configured to generate the top-down inference information for a node based, at least in part, on the direct inference information derived for the node and contextual information from one or more parent nodes included in the hierarchical graph.

8. The system of claim 1, wherein:

the neural network architecture comprises a bottom-up inference network; and the bottom-up inference network is configured to generate the bottom-up inference information for a node based, at least in part, on the direct inference information derived for the node and contextual information from one or more child nodes included in the hierarchical graph.

9. The system of claim 1, wherein:

the direct inference information, the top-down inference information, and the bottom-up inference information each comprise one or more segmentation maps, and the one or more segmentation maps are combined or fused to generate final predictions for each of the nodes.

10. The system of claim 1, wherein the human parsing network is integrated with, or communicates with, one or more of: a surveillance application, a facial recognition application, a fashion-related application, or a social media application.

11. A method comprising:

receiving, at a neural network architecture comprising a human parsing network, an image comprising at least one human object;

utilizing a hierarchal graph comprising a plurality of nodes to model the at least one human object, wherein the nodes correspond to anatomical features associated with a human body;

generating inference information for the nodes in the hierarchal graph, wherein generating inference information includes:

deriving, with the neural network architecture, direct inference information for at least a portion of the nodes included in the hierarchal graph;

deriving, with the neural network architecture, top-down inference information for at least a portion of the nodes included in the hierarchal graph; and deriving, with the neural network architecture, bottom-up inference information for at least a portion of the nodes included in the hierarchal graph; and generating, with the neural network architecture, parsing results based, at least in part, on the inference information associated with the nodes.

12. The method of claim 11, wherein:

the neural network architecture comprises a fusion network; and for each node included in the hierarchal graph, the fusion network combines or fuses the inference information derived for the node to obtain a final prediction for the node.

13. The method of claim 12, wherein:

the fusion network includes a gating function that is configured to compute confidence scores associated with the direct inference information, the top-down inference information, and the bottom-up inference information; and the confidence scores are utilized to determine an extent to which the direct inference information, the top-down inference information, and the bottom-up inference information are utilized to generate the final prediction for the node.

14. The method of claim 12, wherein final predictions for the nodes are combined to generate the parsing results for the at least one human object.

15. The method of claim 11, wherein the hierarchal graph utilized to model the at least one human object comprises:

a top tier node that corresponds to an entirety of the at least one human object;

second tier nodes that correspond to an upper body portion and lower body portion of the at least one human object; and third tier nodes that correspond to sub-features of the upper body portion and the lower body portion of the at least one human object.

16. The method of claim 11, wherein:

the neural network architecture comprises a direct inference network; and the direct inference network is configured to generate the direct inference information directly from raw data associated with the image.

17. The method of claim 11, wherein:
the neural network architecture comprises a top-down inference network; and
the top-down inference network is configured to generate the top-down inference information for a node based, at least in part, on the direct inference information derived for the node and contextual information from one or more parent nodes included in the hierarchical graph.

18. The method of claim 11, wherein:
the neural network architecture comprises a bottom-up inference network; and
the bottom-up inference network is configured to generate the bottom-up inference information for a node based, at least in part, on the direct inference information derived for the node and contextual information from one or more child nodes included in the hierarchical graph.

19. The method of claim 11, wherein:
the direct inference information, the top-down inference information, and the bottom-up inference information each comprise one or more segmentation maps, and the one or more segmentation maps are combined or fused to generate final predictions for each of the nodes.

20. A computer program product comprising a non-transitory computer-readable medium, including instructions for causing a computer to:
receive, at a neural network architecture comprising a human parsing network, an image comprising at least one human object;
utilize a hierarchal graph comprising a plurality of nodes to model the at least one human object, wherein the nodes correspond to anatomical features associated with a human body;
generate inference information for the nodes in the hierarchal graph, wherein generating inference information includes:
deriving, with the neural network architecture, direct inference information for at least a portion of the nodes included in the hierarchal graph;
deriving, with the neural network architecture, top-down inference information for at least a portion of the nodes included in the hierarchal graph; and
deriving, with the neural network architecture, bottom-up inference information for at least a portion of the nodes included in the hierarchal graph; and
generate, with the neural network architecture, parsing results based, at least in part, on the inference information associated with the nodes.

* * * * *